(12) United States Patent
Laffargue et al.

(10) Patent No.: US 10,805,603 B2
(45) Date of Patent: *Oct. 13, 2020

(54) VOLUME DIMENSIONING SYSTEM CALIBRATION SYSTEMS AND METHODS

(71) Applicant: INTERMEC IP CORP., Everett, WA (US)

(72) Inventors: Franck Laffargue, Toulouse (FR); Serge Thuries, Saint Jean (FR); H. Sprague Ackley, Seattle, WA (US)

(73) Assignee: INTERMEC IP CORP., Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,189

(22) Filed: May 6, 2019

(65) Prior Publication Data
US 2019/0335168 A1 Oct. 31, 2019

Related U.S. Application Data

(63) Continuation of application No. 13/786,131, filed on Mar. 5, 2013, now Pat. No. 10,321,127.
(Continued)

(51) Int. Cl.
*H04N 17/00* (2006.01)
*G01F 25/00* (2006.01)
*G01F 17/00* (2006.01)

(52) U.S. Cl.
CPC ........... *H04N 17/002* (2013.01); *G01F 17/00* (2013.01); *G01F 25/0084* (2013.01)

(58) Field of Classification Search
CPC .... H04N 17/002; G01F 17/00; G01F 25/0084
See application file for complete search history.

(56) References Cited

U.S. PATENT DOCUMENTS

| 3,971,065 A | 7/1976 | Bayer |
| 4,279,328 A | 7/1981 | Ahlbom |

(Continued)

FOREIGN PATENT DOCUMENTS

| AU | 2004212587 A1 | 4/2005 |
| DE | 3335760 A1 | 4/1985 |

(Continued)

OTHER PUBLICATIONS

Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.

(Continued)

*Primary Examiner* — Joseph G Ustaris
*Assistant Examiner* — Jill D Sechser
(74) *Attorney, Agent, or Firm* — Alston & Bird LLP

(57) ABSTRACT

Various corporate, industry, and regulatory guidelines, best practices and standards are used in establishing acceptable levels of accuracy for volume dimensioning systems used in commerce. A volume dimensioning system can determine at least one distortion value that is indicative of an amount of distortion present in the system and responsive to the amount of distortion, autonomously alter or adjust the units of accuracy of information reported by the system. Such alteration or adjustment of units of accuracy may be performed based on an assessment of the distortion relative to a number of distortion thresholds. Responsive to the assessment, the volume dimensioning system can adjust a unit of accuracy in a representation of volume dimensioning related information.

20 Claims, 7 Drawing Sheets

Related U.S. Application Data

(60) Provisional application No. 61/691,093, filed on Aug. 20, 2012.

(56) References Cited

U.S. PATENT DOCUMENTS

| | | | |
|---|---|---|---|
| 4,398,811 A | 8/1983 | Nishioka et al. |
| 4,495,559 A | 1/1985 | Gelatt et al. |
| 4,730,190 A | 3/1988 | Win et al. |
| 4,803,639 A | 2/1989 | Steele et al. |
| 4,914,460 A | 4/1990 | Caimi et al. |
| 4,974,919 A | 12/1990 | Muraki et al. |
| 5,111,325 A | 5/1992 | Dejager |
| 5,175,601 A | 12/1992 | Fitts |
| 5,184,733 A | 2/1993 | Arnarson et al. |
| 5,220,536 A | 6/1993 | Stringer et al. |
| 5,243,619 A | 9/1993 | Albers et al. |
| 5,331,118 A | 7/1994 | Jensen |
| 5,359,185 A | 10/1994 | Hanson |
| 5,384,901 A | 1/1995 | Glassner et al. |
| 5,477,622 A | 12/1995 | Skalnik |
| 5,548,707 A | 8/1996 | Lonegro et al. |
| 5,555,090 A | 9/1996 | Schmutz |
| 5,561,526 A | 10/1996 | Huber et al. |
| 5,590,060 A | 12/1996 | Granville et al. |
| 5,592,333 A | 1/1997 | Lewis |
| 5,606,534 A | 2/1997 | Stringer et al. |
| 5,619,245 A | 4/1997 | Kessler et al. |
| 5,655,095 A | 8/1997 | Lonegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,748,199 A | 5/1998 | Palm |
| 5,767,962 A | 6/1998 | Suzuki et al. |
| 5,802,092 A | 9/1998 | Endriz |
| 5,808,657 A | 9/1998 | Kurtz et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | Lonegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,115,114 A | 9/2000 | Berg et al. |
| 6,137,577 A | 10/2000 | Woodworth |
| 6,177,999 B1 | 1/2001 | Wurz et al. |
| 6,189,223 B1 | 2/2001 | Haug |
| 6,232,597 B1 | 5/2001 | Kley |
| 6,236,403 B1 | 5/2001 | Chaki et al. |
| 6,246,468 B1 | 6/2001 | Dimsdale |
| 6,333,749 B1 | 12/2001 | Reinhardt et al. |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D et al. |
| 6,535,776 B1 | 3/2003 | Tobin et al. |
| 6,641,042 B1 | 11/2003 | Pierenkemper et al. |
| 6,661,521 B1 | 12/2003 | Stern |
| 6,674,904 B1 | 1/2004 | McQueen |
| 6,689,998 B1 | 2/2004 | Bremer |
| 6,705,526 B1 | 3/2004 | Zhu et al. |
| 6,750,769 B1 | 6/2004 | Smith |
| 6,773,142 B2 | 8/2004 | Rekow |
| 6,781,621 B1 | 8/2004 | Gobush et al. |
| 6,804,269 B2 | 10/2004 | Lizotte et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,912,293 B1 | 6/2005 | Korobkin |
| 6,922,632 B2 | 7/2005 | Foxlin |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Zhu et al. |
| 7,137,556 B1 | 11/2006 | Bonner et al. |
| 7,159,783 B2 | 1/2007 | Walczyk et al. |
| 7,161,688 B1 | 1/2007 | Bonner et al. |
| 7,205,529 B2 | 4/2007 | Andersen et al. |
| 7,214,954 B2 | 5/2007 | Schopp |
| 7,233,682 B2 | 6/2007 | Levine |
| 7,277,187 B2 | 10/2007 | Smith et al. |
| 7,307,653 B2 | 12/2007 | Dutta |
| 7,310,431 B2 | 12/2007 | Gokturk et al. |
| 7,313,264 B2 | 12/2007 | Crampton |
| 7,413,127 B2 | 8/2008 | Ehrhart et al. |
| 7,527,205 B2 | 5/2009 | Zhu et al. |
| 7,551,149 B2 | 6/2009 | Higham |
| 7,586,049 B2 | 9/2009 | Wurz |
| 7,602,404 B1 | 10/2009 | Reinhardt et al. |
| 7,614,563 B1 | 11/2009 | Nunnink et al. |
| 7,639,722 B1 | 12/2009 | Paxton et al. |
| 7,726,206 B2 | 6/2010 | Terrafranca et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,912,320 B1 | 3/2011 | Minor |
| 7,974,025 B2 | 7/2011 | Topliss |
| 8,009,358 B2 | 8/2011 | Zalevsky et al. |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,061,610 B2 | 11/2011 | Nunnink |
| 8,072,581 B1 | 12/2011 | Breiholz |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,212,889 B2 | 7/2012 | Chanas et al. |
| 8,224,133 B2 | 7/2012 | Popovich et al. |
| 8,228,510 B2 | 7/2012 | Pangrazio et al. |
| 8,230,367 B2 | 7/2012 | Bell et al. |
| 8,294,969 B2 | 10/2012 | Plesko |
| 8,301,027 B2 | 10/2012 | Shaw et al. |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,320,621 B2 | 11/2012 | McEldowney |
| 8,322,622 B2 | 12/2012 | Liu |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,366,005 B2 | 2/2013 | Kotlarsky et al. |
| 8,368,762 B1 | 2/2013 | Chen et al. |
| 8,371,507 B2 | 2/2013 | Haggerty et al. |
| 8,374,498 B2 | 2/2013 | Pastore |

(56) References Cited

U.S. PATENT DOCUMENTS

| | | |
|---|---|---|
| 8,376,233 B2 | 2/2013 | Horn et al. |
| 8,381,976 B2 | 2/2013 | Mohideen et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,810,779 B1 | 8/2014 | Hilde |
| 8,820,630 B2 | 9/2014 | Qu et al. |
| 8,822,806 B2 | 9/2014 | Cockerell et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,897,596 B1 | 11/2014 | Passmore et al. |
| 8,903,172 B2 | 12/2014 | Smith |
| 8,908,277 B2 | 12/2014 | Pesach et al. |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |

(56) References Cited

U.S. PATENT DOCUMENTS

| | | |
|---|---|---|
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,993,974 B2 | 3/2015 | Goodwin |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,014,441 B2 | 4/2015 | Truyen et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,066,087 B2 | 6/2015 | Shpunt |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,082,195 B2 | 7/2015 | Holeva et al. |
| 9,142,035 B1 | 9/2015 | Rotman et al. |
| 9,233,470 B1 | 1/2016 | Bradski et al. |
| 9,273,846 B1 | 3/2016 | Rossi et al. |
| 9,299,013 B1 | 3/2016 | Curlander et al. |
| 9,366,861 B1 | 6/2016 | Johnson |
| 9,399,557 B1 | 7/2016 | Mishra et al. |
| 9,424,749 B1 | 8/2016 | Reed et al. |
| 9,470,511 B2 | 10/2016 | Maynard et al. |
| 9,486,921 B1 | 11/2016 | Straszheim et al. |
| 9,709,387 B2 | 7/2017 | Fujita et al. |
| 9,736,459 B2 | 8/2017 | Mor et al. |
| 9,741,136 B2 | 8/2017 | Holz |
| 9,828,223 B2 | 11/2017 | Svensson et al. |
| 2001/0027995 A1 | 10/2001 | Patel et al. |
| 2001/0032879 A1 | 10/2001 | He et al. |
| 2002/0036765 A1 | 3/2002 | McCaffrey et al. |
| 2002/0067855 A1 | 6/2002 | Chiu et al. |
| 2002/0105639 A1 | 8/2002 | Roelke |
| 2002/0109835 A1 | 8/2002 | Goetz |
| 2002/0113946 A1 | 8/2002 | Kitaguchi et al. |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0186897 A1 | 12/2002 | Kim et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0071118 A1 | 4/2003 | Gershman et al. |
| 2003/0091227 A1 | 5/2003 | Chang et al. |
| 2003/0156756 A1 | 8/2003 | Gokturk et al. |
| 2003/0163287 A1 | 8/2003 | Vock et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0132297 A1 | 7/2004 | Baba et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128193 A1 | 6/2005 | Lueder |
| 2005/0128196 A1 | 6/2005 | Popescu et al. |
| 2005/0168488 A1 | 8/2005 | Montague |
| 2005/0190098 A1 | 9/2005 | Bridgelall et al. |
| 2005/0211782 A1 | 9/2005 | Martin et al. |
| 2005/0240317 A1 | 10/2005 | Kienzle-Lietl |
| 2005/0257748 A1 | 11/2005 | Kriesel et al. |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0109105 A1 | 5/2006 | Varner et al. |
| 2006/0112023 A1 | 5/2006 | Horhann et al. |
| 2006/0122497 A1 | 6/2006 | Glossop |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0197652 A1 | 9/2006 | Hild et al. |
| 2006/0232681 A1 | 10/2006 | Okada |
| 2006/0255150 A1 | 11/2006 | Longacre, Jr. |
| 2006/0269165 A1 | 11/2006 | Viswanathan |
| 2006/0276709 A1 | 12/2006 | Khamene et al. |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0162190 A1 | 7/2007 | Choubey |
| 2007/0165013 A1 | 7/2007 | Goulanian et al. |

(56) References Cited

U.S. PATENT DOCUMENTS

| | | |
|---|---|---|
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0184898 A1 | 8/2007 | Miller et al. |
| 2007/0229665 A1 | 10/2007 | Tobiason et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0047760 A1 | 2/2008 | Georgitsis |
| 2008/0050042 A1 | 2/2008 | Zhang et al. |
| 2008/0054062 A1 | 3/2008 | Gunning et al. |
| 2008/0056536 A1 | 3/2008 | Hildreth et al. |
| 2008/0062164 A1 | 3/2008 | Bassi et al. |
| 2008/0065509 A1 | 3/2008 | Williams |
| 2008/0077265 A1 | 3/2008 | Boyden et al. |
| 2008/0079955 A1 | 4/2008 | Storm |
| 2008/0156619 A1 | 7/2008 | Patel et al. |
| 2008/0164074 A1 | 7/2008 | Wurz |
| 2008/0185432 A1 | 8/2008 | Caballero et al. |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0046296 A1 | 2/2009 | Kilpatrick et al. |
| 2009/0059004 A1 | 3/2009 | Bochicchio |
| 2009/0095047 A1 | 4/2009 | Patel et al. |
| 2009/0114818 A1 | 5/2009 | Casares et al. |
| 2009/0134221 A1 | 5/2009 | Zhu et al. |
| 2009/0161090 A1 | 6/2009 | Campbell et al. |
| 2009/0189858 A1 | 7/2009 | Lev et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler et al. |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg et al. |
| 2010/0035637 A1 | 2/2010 | Varanasi et al. |
| 2010/0060604 A1 | 3/2010 | Zwart et al. |
| 2010/0091104 A1 | 4/2010 | Sprigle et al. |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Arnz |
| 2010/0274728 A1 | 10/2010 | Kugelman |
| 2010/0284041 A1 | 11/2010 | Warnes |
| 2010/0290665 A1 | 11/2010 | Sones et al. |
| 2010/0303336 A1 | 12/2010 | Abraham et al. |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0040407 A1 | 2/2011 | Lim et al. |
| 2011/0043609 A1 | 2/2011 | Choi et al. |
| 2011/0075936 A1 | 3/2011 | Deaver |
| 2011/0081044 A1 | 4/2011 | Peeper et al. |
| 2011/0099474 A1 | 4/2011 | Grossman et al. |
| 2011/0169999 A1 | 7/2011 | Grunow et al. |
| 2011/0180695 A1 | 7/2011 | Li et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0243432 A1 | 10/2011 | Hirsch, Jr. |
| 2011/0249864 A1 | 10/2011 | Venkatesan et al. |
| 2011/0254840 A1 | 10/2011 | Halstead |
| 2011/0260965 A1 | 10/2011 | Kim et al. |
| 2011/0279916 A1 | 11/2011 | Brown et al. |
| 2011/0286007 A1 | 11/2011 | Pangrazio et al. |
| 2011/0288818 A1 | 11/2011 | Thierman et al. |
| 2011/0297590 A1 | 12/2011 | Ackley et al. |
| 2011/0301994 A1 | 12/2011 | Tieman |
| 2011/0303748 A1 | 12/2011 | Lemma et al. |
| 2011/0310227 A1 | 12/2011 | Konertz et al. |
| 2011/0310256 A1 | 12/2011 | Shishido |
| 2012/0014572 A1 | 1/2012 | Wong et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0082383 A1 | 4/2012 | Kruglick |
| 2012/0111946 A1 | 5/2012 | Golant |
| 2012/0113223 A1 | 5/2012 | Hilliges et al. |
| 2012/0113250 A1 | 5/2012 | Farlotti et al. |
| 2012/0126000 A1 | 5/2012 | Kunzig et al. |
| 2012/0138685 A1 | 6/2012 | Qu et al. |
| 2012/0140300 A1 | 6/2012 | Freeman |
| 2012/0168509 A1 | 7/2012 | Nunnink et al. |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 8/2012 | Rhoads et al. |
| 2012/0223141 A1 | 9/2012 | Good et al. |
| 2012/0224026 A1 | 9/2012 | Bayer et al. |
| 2012/0224060 A1 | 9/2012 | Gurevich et al. |
| 2012/0228382 A1 | 9/2012 | Havens et al. |
| 2012/0236212 A1 | 9/2012 | Itoh et al. |
| 2012/0236288 A1 | 9/2012 | Stanley |
| 2012/0236326 A1 | 9/2012 | Lee |
| 2012/0242852 A1 | 9/2012 | Hayward et al. |
| 2012/0248188 A1 | 10/2012 | Kearney |
| 2012/0256901 A1 | 10/2012 | Bendall |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294478 A1 | 11/2012 | Publicover et al. |
| 2012/0294549 A1 | 11/2012 | Doepke |
| 2012/0299961 A1 | 11/2012 | Ramkumar et al. |
| 2012/0300991 A1 | 11/2012 | Free |
| 2012/0313848 A1 | 12/2012 | Galor et al. |
| 2012/0314030 A1 | 12/2012 | Datta et al. |
| 2012/0314058 A1 | 12/2012 | Bendall et al. |
| 2012/0314258 A1 | 12/2012 | Moriya |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0043312 A1 | 2/2013 | Van Horn |
| 2013/0050426 A1 | 2/2013 | Sarmast et al. |
| 2013/0056285 A1 | 3/2013 | Meagher |

(56) References Cited

U.S. PATENT DOCUMENTS

| | | |
|---|---|---|
| 2013/0070322 A1 | 3/2013 | Fritz et al. |
| 2013/0075168 A1 | 3/2013 | Amundsen et al. |
| 2013/0076857 A1 | 3/2013 | Kurashige et al. |
| 2013/0093895 A1 | 4/2013 | Palmer et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0208164 A1 | 8/2013 | Cazier et al. |
| 2013/0211790 A1 | 8/2013 | Loveland et al. |
| 2013/0222592 A1 | 8/2013 | Gieseke |
| 2013/0223673 A1 | 8/2013 | Davis et al. |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0317642 A1 | 11/2013 | Asaria et al. |
| 2013/0329012 A1 | 12/2013 | Bartos et al. |
| 2013/0329013 A1 | 12/2013 | Metois et al. |
| 2013/0341399 A1 | 12/2013 | Xian et al. |
| 2013/0342343 A1 | 12/2013 | Harring et al. |
| 2013/0342717 A1 | 12/2013 | Havens et al. |
| 2014/0001258 A1 | 1/2014 | Chan et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0009586 A1 | 1/2014 | McNamer et al. |
| 2014/0019005 A1 | 1/2014 | Lee et al. |
| 2014/0021259 A1 | 1/2014 | Moed et al. |
| 2014/0025584 A1 | 1/2014 | Liu et al. |
| 2014/0027518 A1 | 1/2014 | Edmonds et al. |
| 2014/0031665 A1 | 1/2014 | Pinto et al. |
| 2014/0034731 A1 | 2/2014 | Gao et al. |
| 2014/0034734 A1 | 2/2014 | Sauerwein, Jr. |
| 2014/0036848 A1 | 2/2014 | Pease et al. |
| 2014/0039674 A1 | 2/2014 | Motoyama et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061305 A1 | 3/2014 | Nahill et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0079297 A1 | 3/2014 | Tadayon et al. |
| 2014/0084068 A1 | 3/2014 | Gillet et al. |
| 2014/0097238 A1 | 4/2014 | Ghazizadeh |
| 2014/0097249 A1 | 4/2014 | Gomez et al. |
| 2014/0097252 A1 | 4/2014 | He et al. |
| 2014/0098091 A1 | 4/2014 | Hori |
| 2014/0098243 A1 | 4/2014 | Ghazizadeh |
| 2014/0098244 A1 | 4/2014 | Ghazizadeh |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0104664 A1 | 4/2014 | Lee et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Long et al. |
| 2014/0121445 A1 | 5/2014 | Fontenot et al. |
| 2014/0124577 A1 | 5/2014 | Wang et al. |
| 2014/0124579 A1 | 5/2014 | Ding |
| 2014/0125577 A1 | 5/2014 | Hoang |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0139654 A1 | 5/2014 | Takahashi |
| 2014/0140585 A1 | 5/2014 | Wang |
| 2014/0142398 A1 | 5/2014 | Patil et al. |
| 2014/0151453 A1 | 6/2014 | Meier et al. |
| 2014/0152882 A1 | 6/2014 | Samek et al. |
| 2014/0152975 A1 | 6/2014 | Ko |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0160329 A1 | 6/2014 | Ren et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0166760 A1 | 6/2014 | Meier et al. |
| 2014/0166761 A1 | 6/2014 | Todeschini et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175169 A1 | 6/2014 | Kosecki et al. |
| 2014/0175172 A1 | 6/2014 | Jovanovski et al. |
| 2014/0175174 A1 | 6/2014 | Barber et al. |
| 2014/0177931 A1 | 6/2014 | Kocherscheidt et al. |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0201126 A1 | 7/2014 | Zadeh et al. |
| 2014/0203087 A1 | 7/2014 | Smith et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0232930 A1 | 8/2014 | Anderson |
| 2014/0240454 A1 | 8/2014 | Hirata et al. |

(56) References Cited

U.S. PATENT DOCUMENTS

| | | |
|---|---|---|
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1 | 9/2014 | Tohme et al. |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | Digregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0306833 A1 | 10/2014 | Ricci |
| 2014/0307855 A1 | 10/2014 | Withagen et al. |
| 2014/0312121 A1 | 10/2014 | Lu et al. |
| 2014/0313527 A1 | 10/2014 | Askan |
| 2014/0319219 A1 | 10/2014 | Liu et al. |
| 2014/0319220 A1 | 10/2014 | Coyle |
| 2014/0319221 A1 | 10/2014 | Oberpriller et al. |
| 2014/0320408 A1 | 10/2014 | Zagorsek et al. |
| 2014/0320605 A1 | 10/2014 | Johnson |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0350710 A1 | 11/2014 | Gopalakrishnan et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1 | 12/2014 | Nishitani et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0016712 A1 | 1/2015 | Rhoads et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0070158 A1 | 3/2015 | Hayasaka |
| 2015/0070489 A1 | 3/2015 | Hudman et al. |
| 2015/0071818 A1 | 3/2015 | Scheuren et al. |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0116498 A1 | 4/2015 | Vartiainen et al. |
| 2015/0117749 A1 | 4/2015 | Smith et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0130928 A1 | 5/2015 | Maynard et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0163474 A1 | 6/2015 | You et al. |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0201181 A1 | 7/2015 | Moore et al. |
| 2015/0204662 A1 | 7/2015 | Kobayashi et al. |
| 2015/0204671 A1 | 7/2015 | Showering |
| 2015/0213590 A1 | 7/2015 | Brown et al. |
| 2015/0213647 A1 | 7/2015 | Laffargue et al. |
| 2015/0219748 A1 | 8/2015 | Hyatt et al. |
| 2015/0229838 A1 | 8/2015 | Hakim et al. |
| 2015/0243030 A1 | 8/2015 | Pfeiffer |
| 2015/0248578 A1 | 9/2015 | Utsumi |
| 2015/0253469 A1 | 9/2015 | Le et al. |
| 2015/0260830 A1 | 9/2015 | Ghosh et al. |
| 2015/0276379 A1 | 10/2015 | Ni et al. |
| 2015/0308816 A1 | 10/2015 | Laffargue |
| 2015/0316368 A1 | 11/2015 | Moench et al. |
| 2015/0325036 A1 | 11/2015 | Lee |
| 2015/0332075 A1 | 11/2015 | Burch |
| 2015/0332463 A1 | 11/2015 | Galera et al. |
| 2015/0355470 A1 | 12/2015 | Herschbach |
| 2016/0048725 A1 | 2/2016 | Holz et al. |
| 2016/0063429 A1 | 3/2016 | Varley et al. |
| 2016/0065912 A1 | 3/2016 | Peterson |
| 2016/0090283 A1 | 3/2016 | Svensson et al. |
| 2016/0090284 A1 | 3/2016 | Svensson et al. |
| 2016/0094016 A1 | 3/2016 | Beach et al. |
| 2016/0138247 A1 | 5/2016 | Conway et al. |
| 2016/0138248 A1 | 5/2016 | Conway et al. |
| 2016/0138249 A1 | 5/2016 | Conway et al. |
| 2016/0147408 A1 | 5/2016 | Bevis et al. |
| 2016/0164261 A1 | 6/2016 | Warren |
| 2016/0169665 A1 | 6/2016 | Deschenes et al. |
| 2016/0178915 A1 | 6/2016 | Mor et al. |
| 2016/0187186 A1 | 6/2016 | Coleman et al. |
| 2016/0187187 A1 | 6/2016 | Coleman et al. |
| 2016/0187210 A1 | 6/2016 | Coleman et al. |
| 2016/0191801 A1 | 6/2016 | Sivan |
| 2016/0202478 A1 | 7/2016 | Masson et al. |
| 2016/0203641 A1 | 7/2016 | Bostick et al. |
| 2016/0210780 A1 | 7/2016 | Paulovich et al. |
| 2016/0223474 A1 | 8/2016 | Tang et al. |
| 2016/0328854 A1 | 11/2016 | Kimura |
| 2017/0103545 A1 | 4/2017 | Holz |
| 2017/0115490 A1 | 4/2017 | Hsieh et al. |
| 2017/0115497 A1 | 4/2017 | Chen et al. |
| 2017/0116462 A1 | 4/2017 | Ogasawara |
| 2017/0121158 A1 | 5/2017 | Wong et al. |
| 2017/0132806 A1 | 5/2017 | Balachandreswaran |
| 2017/0139213 A1 | 5/2017 | Schmidtlin |
| 2017/0148250 A1 | 5/2017 | Angermayer et al. |
| 2017/0182942 A1 | 6/2017 | Hardy et al. |
| 2017/0200296 A1 | 7/2017 | Jones et al. |
| 2017/0309108 A1 | 10/2017 | Sadovsky et al. |
| 2017/0336870 A1 | 11/2017 | Everett et al. |

(56) References Cited

U.S. PATENT DOCUMENTS

FOREIGN PATENT DOCUMENTS

| | | | |
|---|---|---|---|
| DE | 10210813 A1 | 10/2003 |
| DE | 102007037282 A1 | 3/2008 |
| EP | 1443312 A1 | 8/2004 |
| EP | 1112483 B1 | 5/2006 |
| EP | 1232480 B1 | 5/2006 |
| EP | 2216634 A1 | 8/2010 |
| EP | 2286932 A2 | 2/2011 |
| EP | 2372648 A2 | 10/2011 |
| EP | 2381421 A2 | 10/2011 |
| EP | 2533009 A2 | 12/2012 |
| EP | 2722656 A1 | 4/2014 |
| EP | 2779027 A1 | 9/2014 |
| EP | 2833323 A2 | 2/2015 |
| EP | 2843590 A2 | 3/2015 |
| EP | 2845170 A1 | 3/2015 |
| EP | 2966595 A1 | 1/2016 |
| EP | 3006893 A1 | 4/2016 |
| EP | 3007096 A1 | 4/2016 |
| EP | 3012601 A1 | 4/2016 |
| GB | 2525053 A | 10/2015 |
| GB | 2531928 A | 5/2016 |
| JP | 04-129902 A | 4/1992 |
| JP | 2006-096457 A | 4/2006 |
| JP | 2007-084162 A | 4/2007 |
| JP | 2008-210276 A | 9/2008 |
| JP | 2014-210646 A | 11/2014 |
| JP | 2015-174705 A | 10/2015 |
| KR | 10-2011-0013200 A | 2/2011 |
| KR | 10-2011-0117020 A | 10/2011 |
| KR | 10-2012-0028109 A | 3/2012 |
| WO | 96/40452 A1 | 12/1996 |
| WO | 00/77726 A1 | 12/2000 |
| WO | 2006/095110 A1 | 9/2006 |
| WO | 2007/015059 A1 | 2/2007 |
| WO | 2011/017241 A1 | 2/2011 |
| WO | 2012/175731 A1 | 12/2012 |
| WO | 2013/021157 A1 | 2/2013 |
| WO | 2013/033442 A1 | 3/2013 |
| WO | 2013/163789 A1 | 11/2013 |
| WO | 2013/166368 A1 | 11/2013 |
| WO | 2013/173985 A1 | 11/2013 |
| WO | 2013/184340 A1 | 12/2013 |
| WO | 2014/019130 A1 | 2/2014 |
| WO | 2014/110495 A1 | 7/2014 |
| WO | 2014/149702 A1 | 9/2014 |
| WO | 2014/151746 A2 | 9/2014 |
| WO | 20151006865 A1 | 1/2015 |
| WO | 20161020038 A1 | 2/2016 |
| WO | 20161061699 A1 | 4/2016 |
| WO | 20161085682 A1 | 6/2016 |

OTHER PUBLICATIONS

Hahnel et al., "Mapping and Localization with RFID Technology," IEEE International Conference on Robotics and Automation, vol. 1, Apr. 26-May 1, 2004, pp. 1015-1020.

Gupta, Alok; Range Image Segmentation for 3-D Objects Recognition, May 1988, Technical Reports (CIS), Paper 736, University of Pennsylvania Department of Computer and Information Science, retrieved from http://repository.upenn.edu/cis_reports/736, Accessed May 31, 2015, 157 pages.

Great Britain Search Report for related Application On. GB1517843. 7, dated Feb. 23, 2016; 8 pages.

Great Britain Combined Search and Examination Report in related Application GB1517842.9, dated Apr. 8, 2016, 8 ages [References previously cited].

Grabowski, Ralph; "New Commands in AutoCADS 2010: Part 11 Smoothing 3D Mesh Objects" Dated 2011 (per examiner who cited reference), 6 pages, [Examiner Cited Art in Office Action dated Jan. 20, 2017 in related Application.].

Fukaya et al., "Characteristics of Speckle Random Pattern and Its Applications", pp. 317-327, Nouv. Rev. Optique, t.6, n.6. (1975) {in Feb. 9, 2017 Final Office Action in related matter: downloaded Mar. 2, 2017 from http://iopscience.iop.org}.

First Office Action in related CN Application No. 201510860188.1 dated Jan. 18, 2019, pp. 1-14 [All references previously cited].

Extended European Search report in related EP Application No. 17190323.0 dated Jan. 19, 2018; 6 pages [Only new art cited herein].

Extended European Search report in related EP Application No. 17189496.7 dated Dec. 5, 2017; 9 pages.

Extended European Search Report in related EP Application No. 16175410.0, dated Dec. 13, 2016, 5 pages.

Extended European search report in related EP Application 16199707. 7, dated Apr. 10, 2017, 15 pages.

Extended European Search Report in counterpart European Application No. 15182675.7 dated Dec. 4, 2015, pp. 1-10 references previously cited.

Examination Report in related UK Application No. GB1517842.9 dated Mar. 8, 2019, pp. 1-4.

Examination Report in related UK Application No. GB1517842.9 dated Dec. 21, 2018, pp. 1-7 [All references previously cited.].

Examination Report in related GB Application No. GB1517843.7, dated Jan. 19, 2018, 4 pages [Only new art cited herein].

Examination Report in related EP Application No. 15190315, dated Jan. 26, 2018, 6 pages [Only new art cited herein].

Examination Report in related EP Application No. 13785171.3 dated Apr. 2, 2019, pp. 1-5.

Examination Report in related EP Application No. 13193181.8 dated Mar. 20, 2019, pp. 1-4.

European Search Report in related EP Application No. 17175357.7, dated Aug. 17, 2017, pp. 1-7 [No new art to be cited].

European Search Report in related EP Application No. 15190315.0, dated Apr. 1, 2016, 7 pages [Commonly owned Reference 2014/ 0104416 has been previously cited].

European Search Report from related EP Application No. 16168216. 6, dated Oct. 20, 2016, 8 pages [U.S. Publication 2014/0104413 has been previously cited].

European Search Report for Related EP Application No. 15189214. 8, dated Mar. 3, 2016, 9 pages.

European Search Report for related EP Application No. 15188440. 0, dated Mar. 8, 2016, 8 pages.

European Search Report for related Application EP 15190249.1, dated Mar. 22, 2016, 7 pages.

European Search Report for application No. EP13186043 (now EP2722656 (dated Apr. 23, 2014)): Total pp. 7.

European Patent Search Report for Application No. 14157971.4-1906, dated Jun. 30, 2014, 6 pages.

European Patent Office Action for Application No. 14157971.4-1906, dated Jul. 16, 2014, 5 pages.

European Office Action for application EP 13186043, dated Jun. 12, 2014(now EP2722656 (dated Apr. 23, 2014)), Total of 6 pages.

European Extended Search Report in related EP Application No. 17201794.9, dated Mar. 16, 2018, 10 pages [Only new art cited herein].

European Extended Search Report in related EP Application No. 16190017.0, dated Jan. 4, 2017, 6 pages.

European Extended search report in related EP Application No. 15190306.9, dated Sep. 9, 2016, 15 pages [only new references are cited; remaining references were cited with partial search report in same application dated May 6, 2016].

European Extended Search Report in related EP application 18184864. 9, dated Oct. 30, 2018, 7 pages.

European Extended Search Report in related EP Application 17205030. 4, dated Mar. 22, 2018, 8 pages.

European extended search report in related EP Application 16190833. 0, dated Mar. 9, 2017, 8 pages [only new art has been cited; US Publication 2014/0034731 was previously cited].

European extended Search report in related EP Application 13785171. 3, dated Sep. 19, 2016, 8 pages.

European extended Search Report in related Application No. 17207882.6 dated Apr. 26, 2018, 10 pages.

(56) References Cited

OTHER PUBLICATIONS

European Examination report in related EP Application No. 14181437.6, dated Feb. 8, 2017, 5 pages [References have been previously cited].
European Exam Report in related, EP Application No. 16168216.6, dated Feb. 27, 2017, 5 pages, [References have been previously cited; WO2011/017241 and US 2014/0104413].
European Exam Report in related EP Application No. 16152477.2, dated Jun. 20, 2017, 4 pages [No art to be cited].
European Exam Report in related EP Application No. 15188440.0, dated Apr. 21, 2017, 4 pages [No new art to cite].
European Exam Report in related EP Application No. 15176943.7, dated Apr. 12, 2017, 6 pages [Art previously cited in this matter].
European Exam Report in related EP Application 16172995.9, dated Mar. 15, 2018, 7 pages (Only new art cited herein).
European Exam Report in related EP Applcaition 16172995.9, dated Jul. 6, 2017, 9 pages [No new art to be cited].
EP Search and Written Opinion Report in related matter EP Application No. 1418437.6, dated Mar. 26, 2015, 7 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_E1 -Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
EKSMA Optics, Examiner Cited NPL in Advisory Action dated Apr. 12, 2017 in related commonly owned application, downloaded from http://eksmaoptics.com/optical-systems/f-theta-lenses/f-theta-lens-for-1064-nm/, 2 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
Dimensioning—Wikipedia, the Free Encyclopedia, URL=http://en.wikipedia.org/wiki/Dimensioning, download date Aug. 1, 2008, 1 page.
U.S. Patent Application for High Dynamic-Range Indicia Reading System, filed Dec. 10, 2013 (Xian); 28 pages., U.S. Appl. No. 14/101,965.
U.S. Patent Application for Hands-Free Human Machine Interface Responsive to a Driver of a Vehicle filed May 6, 2015 (Filch et al.); 44 pages, U.S. Appl. No. 14/705,012.
U.S. Patent Application for Handheld Dimensioning System With Measurement-Conformance Feedback filed Oct. 21, 2014 (Ackley et al.); 36 pages, U.S. Appl. No. 14/519,249.
U.S. Patent Application for Handheld Dimensioning System With Feedback filed Oct. 21, 2014 (Laffargue et al.); 39 pages, U.S. Appl. No. 14/519,195.
U.S. Patent Application for Handheld Dimensioner With Data-Quality Indication filed Oct. 21, 2014 (Laffargue et al.); 36 pages, U.S. Appl. No. 14/519,233.
U.S. Patent Application for Hand-Mounted Indicia-Reading Device with Finger Motion Triggering filed Apr. 1, 2014 (Van Horn et al.); 36 pages, U.S. Appl. No. 14/231,898.
U.S. Patent Application for Evaluating Image Values filed May 19, 2015 (Ackley); 60 pages, U.S. Appl. No. 14/715,916.
U.S. Patent Application for Encoded Information Reading Terminal With Wireless Path Selecton Capability, filed Aug. 15, 2014 (Wang et al.); 40 pages, U.S. Appl. No. 14/460,829.
U.S. Patent Application for Dynamic Diagnostic Indicator Generation filed Dec. 17, 2014 (Goldsmith); 43 pages, U.S. Appl. No. 14/573,022.
U.S. Patent Application for Dual-Projector Three-Dimensional Scanner filed Jun. 23, 2015 (Jovanovski et al.); 40 pages, U.S. Appl. No. 14/747,490.
U.S. Patent Application for Docking System and Method Using Near Field Communication filed Apr. 21, 2014 (Showering); 31 pages, U.S. Appl. No. 14/257,364.
U.S. Patent Application for Directing an Inspector Through an Inspection filed Nov. 3, 2014 (Miller et al.); 53 pages, U.S. Appl. No. 14/531,154.
U.S. Patent Application for Dimensioning System, filed Oct. 16, 2013 (Fletcher); 26 pages., U.S. Appl. No. 14/055,234.
U.S. Patent Application for Dimensioning System With Multipath Interference Mitigation filed Oct. 21, 2014 (Thuries et al.); 30 pages., U.S. Appl. No. 14/519,179.
U.S. Patent Application for Dimensioning System With Guided Alignment, filed Aug. 6, 2014 (Li et al.); 31 pages, U.S. Appl. No. 14/453,019.
U.S. Patent Application for Device, System, and Method for Determining the Status of Checkout Lanes filed Feb. 23, 2015 (Todeschini); 37 pages, U.S. Appl. No. 14/628,708.
U.S. Patent Application for Device Management Proxy for Secure Devices filed Apr. 1, 2015 (Yeakley et al.); 50 pages, U.S. Appl. No. 14/676,327.
U.S. Patent Application for Device for Supporting an Electronic Tool on a User's Hand filed Feb. 5, 2015 (Oberpriller et al.); 33 pages, U.S. Appl. No. 14/614,706.
U.S. Patent Application for Design Patiern for Secure Store filed Mar. 9, 2015 (Zhu et al.); 23 pages, U.S. Appl. No. 14/405,278.
U.S. Patent Application for Customer Facing Imaging Systems and Methods for Obtaining Images filed Jul. 10, 2014 (Oberpriller et al,); 39 pages, U.S. Appl. No. 14/327,722.
U.S. Patent Application for Cordless Indicia Reader With a Multi-function Coil for Wireless Charging and EAS Deactivation, filed Jun. 24, 2015 (Xie et al.); 34 pages, U.S. Appl. No. 14/748,446.
U.S. Patent Application for Concatenated Expected Responses for Speech Recognition filed Nov. 7, 2014 (Braho et al.); 51 pages, U.S. Appl. No. 14/535,764.
U.S. Patent Application for Cell Phone Reading Mode Using Image Timer filed Jul. 11, 2014 (Coyle); 22 pages, U.S. Appl. No. 14/329,303.
U.S. Patent Application for Cargo Apportionment Techniques filed Feb. 5, 2015 (Morton et al.); 56 pages, U.S. Appl. No. 14/614,796.
U.S. Patent Application for Calibrating a Volume Dimensioner filed Jun. 16, 2015 (Ackley et al.); 63 pages, U.S. Appl. No. 14/740,373.
U.S. Patent Application for Barcode Scanning System Using Wearable Device With Embedded Camera filed Nov. 5, 2014 (Todeschini); 29 pages, U.S. Appl. No. 14/533,319.
U.S. Patent Application for Barcode Reader With Security Features filed Oct. 31, 2014 (Todeschini et al.); 32 pages, U.S. Appl. No. 14/529,857.
U.S. Patent Application for Autofocusing Optical Imaging Device filed Jun. 20, 2014 (Koziol et al.); 28 pages, U.S. Appl. No. 14/310,226.
U.S. Patent Application for Autofocus Lens System for Indicia Readers filed Apr. 29, 2014, (Ackley et al.); 39 pages., U.S. Appl. No. 14/264,173.
U.S. Patent Application for Auto-Contrast Viewfinder for an Indicia Reader filed Dec. 12, 2014 (Todeschini); 29 pages, U.S. Appl. No. 14/568,305.
U.S. Patent Application for Augumented Reality Enabled Hazard Display filed May 19, 2015 (Venkatesha et al.); 35 pages, U.S. Appl. No. 14/715,672.
U.S. Patent Application for Augmented-Reality Signature Capture, filed Sep. 24, 2013 (Todeschini); 33 pages., U.S. Appl. No. 14/035,474.
U.S. Patent Application for Application Independent DEX/UCS Interface filed May 8, 2015 (Pape); 47 pages, U.S. Appl. No. 14/707,123.
U.S. Patent Application for Apparatus for Displaying Bar Codes From Light Emitting Display Surfaces filed Aug. 15, 2014 (Van Horn et al.); 40 pages, U.S. Appl. No. 14/460,387.
U.S. Patent Application for an Optical Redirection Adapter, filed Feb. 20, 2013 (Anderson); 26 pages., U.S. Appl. No. 13/771,508.
U.S. Patent Application for an Optical Imager and Method for Correlating a Medication Package With a Patient, filed Jul. 25, 2014 (Ellis); 26 pages, U.S. Appl. No. 14/340,716.

(56) References Cited

OTHER PUBLICATIONS

U.S. Patent Application for an Encoded Information Reading Terminal Including HTTP Server filed Aug. 4, 2014, (Lu); 30 pages, U.S. Appl. No. 14/376,472.
U.S. Patent Application for an Electronic Device Case, filed Jul. 2, 2013 (London et al.); 47 pages., U.S. Appl. No. 13/933,415.
U.S. Patent Application for an Axially Reinforced Flexible Scan Element, filed Jul. 25, 2014 (Reublinger et al.); 41 pages, U.S. Appl. No. 14/340,627.
U.S. Patent Application for Aimer for Barcode Scanning filed Mar. 31, 2015 (Bidwell); 36 pages, U.S. Appl. No. 14/674,329.
U.S. Patent Application for Adaptable Interface for a Mobile Computing Device filed Oct. 31, 2014 (Schoon et al.); 36 pages, U.S. Appl. No. 14/529,563.
U.S. Patent Application for a System for Providing a Continuous Communication Link With a Symbol Reading Device, filed May 24, 2013 (Smith et al.); 24 pages., U.S. Appl. No. 13/902,242.
U.S. Patent Application for a System and Method for Selectively Reading Code Symbols, filed Jul. 22, 2013 (Rueblinger et al.); 29 pages., U.S. Appl. No. 13/947,296.
U.S. Patent Application for a System and Method for Reading Code Symbols Using a Variable Field of View, filed Jun. 20, 2013 (Xian et al.); 23 pages., U.S. Appl. No. 13/922,339.
U.S. Patent Application for a System and Method for Reading Code Symbols at Long Range Using Source Power Control, filed Jun. 7, 2013 (Xian et al.); 24 pages., U.S. Appl. No. 13/912,702.
U.S. Patent Application for a System and Method for Indicia Verification, filed Jul. 18, 2014 (Hejl); 38 pages, U.S. Appl. No. 14/334,934.
U.S. Patent Application for a System and Method for Display of Information Using a Vehicle-Mount Computer, filed May 24, 2013 (Hollifield); 29 pages., U.S. Appl. No. 13/902,110.
U.S. Patent Application for a System and Method for Display of Information Using a Vehicle-Mount Computer, filed May 24, 2013 (Chamberlin); 23 pages., U.S. Appl. No. 13/902,144.
U.S. Patent Application for a System and Method for Capturing and Preserving Vehicle Event Data, filed Mar. 28, 2013 (Barker et al.); 20 pages., U.S. Appl. No. 13/852,097.
U.S. Patent Application for a Mobile-Phone Adapter for Electronic Transactions, filed Jul. 10, 2014 (Hejl); 25 pages, U.S. Appl. No. 14/327,827.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
YUV to RGB Conversion, downloaded from http://www.fource.org/fccyvrgb.php on Jun. 29, 2012; 5 pages.
YUV Pixel Format, downloaded from http://www.fource.org/yuv.php on Jun. 29, 2012; 13 pages.
Wikipedia, YUV description and definition, downloaded from http://www.wikipeida.org/wiki/YUV on Jun. 29, 2012, 10 pages.
Wikipedia, "Microlens", Downloaded from https://en.wikipedia.org/wiki/Microlens, pp. 3, (in Feb. 9, 2017 Final Office Action in related matter).
Wikipedia, "3D projection" Downloaded on Nov. 25, 2015 from www.wikipedia.com, 4 pages.
Ward, Benjamin, Interactive 30 Reconstruction from Video, Aug. 2012, Doctoral Thesis, Univesity of Adelaide, Adelaide, South Australia, 157 pages.
Vogt, H., "Multiple Object Identification with Passive RFID Tags," IEEE International Conference on Systems, Man, and Cybernetics, vol. 3, Oct. 6-9, 2002, 6 pages.
United Kingdom Search Report in related Application No. GB1700338.5, dated Jun. 30, 2017, 5 pages.
United Kingdom Search Report in related application GB1517842.9, dated Apr. 8, 2016, 8 pages.
United Kingdom Further Examination Report in related GB Patent Application No. 1620676.5 dated Jul. 17, 2018; 4 pages [No art cited].
United Kingdom Further Examination Report in related GB Patent Application No. 1517842.9 dated Jul. 26, 2018; 5 pages [Cited art has been previously cited in this matter].
United Kingdom Further Examination Report in related GB Patent Application No. 1517112.7 dated Jul. 17, 2018; 4 pages [No art cited].
United Kingdom Further Exam Report in related application GB1607394.2 dated Oct. 5, 2018; 5 pages [Only new art cited here in].
United Kingdom combined Search and Examination Report in related GB Application No. 1607394.2, dated Oct. 19, 2016, 7 pages.
United Kingdom Combined Search and Examination Report in related Application No. GB1620676.5, dated Mar. 8, 2 2017, 6 pages [References have been previously cited; WO2014/151746, WO2012/175731, US 2014/0313527, GB2503978].
United Kingdom Combined Search and Examination Report dated Mar. 21, 2018, 5 pages (Art has been previously cited).
Ulusoy, Ali Osman et al.; "One-Shot Scanning using De Bruijn Spaced Grids", Brown University; 2009 IEEE 12th International Conference on Computer Vision Workshops, ICCV Workshops, pp. 1786-1792 [Cited in EPO Search Report dated Dec. 5, 2017].
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017].
U.S. Patent Application Tyler Doomenbal et al., filed Jul. 16, 2015, not published yet, Adjusting Dimensioning Results Using Augmented Reality, 39 pages, U.S. Appl. No. 14/801,023.
U.S. Patent Application Serge Thuries et al., filed Oct. 21, 2014, not published yet 40 pages., U.S. Appl. No. 14/519,179.
U.S. Patent Application not yet published, Hand Held Products, Inc. filed Oct. 16, 2013; 26 pages, U.S. Appl. No. 14/055,234.
U.S. Patent Application not yet published, filed Sep. 19, 2014, Intermec IP Corporation, Volume Dimensioning System Calibration Systems and Methods:, U.S. Appl. No. 14/490,989.
U.S. Patent Application not yet published, filed Aug. 18, 2014, Hand Held Products Inc., System and Method for Package Dimensioning: 21 pages, U.S. Appl. No. 14/461,524.
U.S. Patent Application not yet published, filed Aug. 6, 2014, Hand Held Products Inc., Dimensioning System With Guided Alignment: 31 pages, U.S. Appl. No. 14/453,019.
U.S. Appl. No. 29/530,600 for Cyclone filed Jun. 18, 2015 (Vargo et al); 16 pages.
U.S. Appl. No. 29/529,441 for Indicia Reading Device filed Jun. 8, 2015 (Zhou et al.); 14 pages.
U.S. Appl. No. 29/528,890 for Mobile Computer Housing filed Jun. 2, 2015 (Filch et al.); 61 pages.
U.S. Appl. No. 29/528,590 for Electronic Device filed May 29, 2015 (Filch et al.); 9 pages.
U.S. Appl. No. 29/528,165 for In-Counter Barcode Scanner filed May 27, 2015 (Oberpriller et al.); 13 pages.
U.S. Appl. No. 29/526,918 for Charging Base filed May 14, 2015 (Filch et al.); 10 pages.
U.S. Appl. No. 29/525,068 for Tablet Computer With Removable Scanning Device filed Apr. 27, 2015 (Schulte et al.); 19 pages.
U.S. Appl. No. 29/524,186 for Scanner filed Apr. 17, 2015 (Zhou et al.); 17 pages.
U.S. Appl. No. 29/523,098 for Handle for a Tablet Computer filed Apr. 7, 2015 (Bidwell et al.); 17 pages.
U.S. Appl. No. 29/519,017 for Scanner filed Mar. 2, 2015 (Zhou et al.); 11 pages.
U.S. Appl. No. 29/516,892 for Table Computer filed Feb. 6, 2015 (Bidwell et al.); 13 pages.
U.S. Appl. No. 29/494,725 for an In-Counter Barcode Scanner, filed Jun. 24, 2014 (Oberpriller et al.); 23 pages.
U.S. Appl. No. 29/492,903 for an Indicia Scanner, filed Jun. 4, 2014 (Zhou et al.); 23 pages.
U.S. Appl. No. 29/486,759 for an Imaging Terminal, filed Apr. 2, 2014 (Oberpriller et al.); 8 pages.
U.S. Appl. No. 29/468,118 for an Electronic Device Case, filed Sep. 26, 2013 (Oberpriller et al.); 44 pages.

(56) References Cited

OTHER PUBLICATIONS

U.S. Appl. No. 29/459,823 for a Scanner, filed Jul. 3, 2013 (Zhou et al.); 13 pages.
U.S. Appl. No. 29/459,785 for a Scanner and Charging Base, filed Jul. 3, 2013 (Fitch et al.); 21 pages.
U.S. Appl. No. 29/459,681 for an Electronic Device Enclosure, filed Jul. 2, 2013 (Chaney et al.); 14 pages.
U.S. Appl. No. 29/459,620 for an Electronic Device Enclosure, filed Jul. 2, 2013 (London et al.); 21 pages.
U.S. Appl. No. 29/458,405 for an Electronic Device, filed Jun. 19, 2013 (Fitch et al.); 22 pages.
U.S. Appl. No. 29/436,337 for an Electronic Device, filed Nov. 5, 2012 (Fitch et al.); 19 pages.
U.S. Patent Application H. Sprague Ackley, filed Jul. 7, 2015, not published yet, Mobile Dimensioner Apparatus for Use in Commerce; 57 pages, U.S. Appl. No. 14/793,149.
U.S. Patent Application H. Sprague Ackley et al., filed Oct. 21, 2014, not published yet 36 pages., U.S. Appl. No. 14/519,249.
U.S. Patent Application H. Sprague Ackley et al., filed Oct. 21, 2014, not published yet 33 pages., U.S. Appl. No. 14/519,211.
U.S. Patent Application Franck Laffargue et al., filed Oct. 21, 2014, not published yet 35 pages., U.S. Appl. No. 14/519,195.
U.S. Appl. No. 13/786,131, filed Mar. 5, 2013, U.S. Pat. No. 10,321,127, Patented.
Dimensional Weight—Wikipedia, the Free Encyclopedia, URL= http://en.wikipedia.org/wiki/Dimensional_weight, download date Aug. 1, 2008, 2 pages.
Decision to Grant in counterpart European Application No. 14157971.4 dated Aug. 6, 2015, pp. 1-2.
Combined Search and Examination Report in related UK Application No. GB1900752.5 dated Feb. 1, 2019, pp. 1-5.
Combined Search and Examination Report in related UK Application No. GB1817189.2 dated Nov. 14, 2018, pp. 1-4 [Reference previously cited.].
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
Chinese Notice of Reexamination in related Chinese Application 201520810313.3, dated Mar. 14, 2017, English Computer Translation provided, 7 pages [No new art cited].
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Butcher et al. (eds.), NIST Handbook 44, 2012 Edition, Section 5.58, "Multiple Dimension Measuring Devices," Oct. 2011, pp. 5-71 to 5-82, 15 pages.
Boukraa et al, "Tag-Based Vision: Assisting 3D Scene Analysis with Radio-Frequency Tags," IEEE International Conference on Image Processing, 2002, pp. 269-272.
Boavida et al., "Dam monitoring using combined terrestrial imaging systems", 2009 Civil Engineering Survey Dec./Jan. 2009, pp. 33-38 {Cited in Notice of Allowance dated Sep. 15, 2017 in related matter}.
Benos et al., "Semi-Automatic Dimensioning with Imager of a Portable Device," U.S. Appl. No. 61/149,912; filed Feb. 4, 2009 (now expired), 56 pages.
U.S. Patent Application for a Mobile Device Having an Improved User Interface for Reading Code Symbols, filed Jun. 28, 2013 (Gelay et al.); 24 pages., U.S. Appl. No. 13/930,913.
U.S. Patent Application for a Method of Error Correction for 30 Imaging Device, filed Jun. 7, 2013 (Jovanovski et al.); 33 pages., U.S. Appl. No. 13/912,262.
U.S. Patent Application for a Method for Operating a Laser Scanner, filed Sep. 5, 2013 (Feng et al.); 24 pages., U.S. Appl. No. 14/018,729.
U.S. Patent Application for a Method for Manufacturing Laser Scanners, filed Aug. 7, 2013 (Saber et al.); 26 pages., U.S. Appl. No. 13/961,408.
U.S. Patent Application for a Handheld Indicia Reader Having Locking Endcap, filed Sep. 11, 2013 (Gannon); 31 pages., U.S. Appl. No. 14/023,762.
U.S. Patent Application for a Device Having Light Source to Reduce Surface Pathogens, filed Sep. 6, 2013 (Todeschini); 23 pages., U.S. Appl. No. 14/019,616.
U.S. Patent Application for a Code Symbol Reading System Having Adjustable Object Detection, filed Jul. 25, 2013 (Jiang); 28 pages., U.S. Appl. No. 13/950,544.
U.S. Patent Application for a Code Symbol Reading System Having Adaptive Autofocus, filed Jun. 26, 2013 (Todeschini); 24 pages., U.S. Appl. No. 13/927,398.
U.S. Patent Application Eric Todeschini, filed Jul. 16, 2015, not published yet, Dimensioning and Imaging Items, 80 pages, U.S. Appl. No. 14/800,757.
U.S. Appl. No. 13/367,978, filed Feb. 7, 2012, (Feng et al.); now abandoned.
Trucco, Emanuele, and Alessandro Verri, Introductory Techniques for 3-D Computer Vision, Prentice Hall, New Jersey, 1998, Chapter 7, "Stereopsis," pp. 139-175., 39 pages.
Todeschini et al.; "Depth Sensor Based Auto-Focus System for an Indicia Scanner," U.S. Patent Application filed Oct. 1, 2015, 44 pages, not yet published., U.S. Appl. No. 14/872,176.
Thorlabs, Examiner Cited NPL in Advisory Action dated Apr. 12, 2017 in related commonly owned application, downloaded from https://www.thorlabs.com/newgrouppage9.cfm?objectgroup_id= 6430, 4 pages.
Theodoropoulos, Gabriel; "Using Gesture Recognizers to Handle Pinch, Rotate, Pan, Swipe, and Tap Gestures" dated Aug. 25, 2014, 34 pages, [Examiner Cited Art in Office Action dated Jan. 20, 2017 in related Application.].
Spiller, Jonathan; Object Localization Using Deformable Templates, Master's Dissertation, University of the Witwatersrand, Johannesburg, South Africa, 2007; 74 pages.
Sill Optics, NPL in Advisory Action dated Apr. 12, 2017 in related commonly owned application, http://www.silloptics.de/1/products/sill-encyclopedia/laser-optics/f-theta-lenses/, 4 pages.
Second Chinese Office Action in related CN Application No. 2015220810562.2, dated Mar. 22, 2016, 5 pages. English Translation provided [No references].
Second Chinese Office Action in related CN Application No. 201520810685.6, dated Mar. 22, 2016, 5 pages, no references.
Second Chinese Office Action in related CN Application No. 201520810313.3, dated Mar. 22, 2016, 5 pages. English Translation provided [No references].
Search Report and Opinion in related GB Application No. 1517112. 7, dated Feb. 19, 2016, 6 Pages (GB2503978 is a commonly owned now abandoned application and not cited above).
Search Report and Opinion in Related EP Application 15176943.7, dated Jan. 8, 2016, 8 pages, (US Application 2014/0049635 has been previously cited).
Salvi, Joaquim et al. "Pattern Codification Strategies in Structured Light Systems" published in Pattern Recognition; The Journal of the Pattern Recognition Society, Accepted Oct. 2, 2003; 23 pages.
Reisner-Kollmann,lrene; Anton L. Fuhrmann, Werner Purgathofer, Interactive Reconstruction of Industrial Sites Using Parametric Models, May 2010, Proceedings of the 26th Spring Conference of Computer Graphics SCCG "10, 8 pages.
Ralph Grabowski, "Smothing 30 Mesh Objects," New Commands in AutoCAD 2010: Part 11, Examiner Cited art in related matter Non Final Office Action dated May 19, 2017; 6 pages.
Proesmans, Marc et al. "Active Acquisition of 3D Shape for Moving Objects" 0-7803-3258-X/96 1996 IEEE; 4 pages.
Peter Clarke, Actuator Developer Claims Anti-Shake Breakthrough for Smartphone Cams, Electronic Engineering Times, p. 24, May 16, 2011.
Padzensky, Ron; "Augmera; Gesture Control", Dated Apr. 18, 2015, 15 pages [Examiner Cited Art in Office Action dated Jan. 20, 2017 in related Application].
Office Action in counterpart European Application No. 13186043.9 dated Sep. 30, 2015, pp. 1-7.
Office Action dated Oct. 23, 2017, for U.S. Appl. No. 13/786,131, 28 pages.

(56) References Cited

OTHER PUBLICATIONS

Office Action dated May 23, 2018, for U.S. Appl. No. 13/786,131, 30 pages.
Office Action dated Mar. 23, 2016, for U.S. Appl. No. 14/490,989, 7 pages.
Office Action dated Jun. 17, 2016, for U.S. Appl. No. 13/786,131, 31 pages.
Office Action dated Jan. 21, 2016, for U.S. Appl. No. 13/786,131, 28 pages.
Office Action dated Apr. 12, 2017, for U.S. Appl. No. 13/786,131, 32 pages.
Notice of Allowance dated Jan. 22, 2019, for U.S. Appl. No. 13/786,131, 7 pages.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
McCloskey et al., "Methods for Improving the Accuracy of Dimensioning-System Measurements," U.S. Patent Application filed Sep. 2, 2015, 47 pages, not yet published., U.S. Appl. No. 14/873,613.
McCloskey et al., "Image Transformation for Indicia Reading," U.S. Patent Application filed Oct. 30, 2015, 48 pages, not yet published., U.S. Appl. No. 14/982,032.
M.Zahid Gurbuz, Selim Akyokus, Ibrahim Emiroglu, Aysun Guran, An Efficient Algorithm for 30 Rectangular Box Packing, 2009, Applied Automatic Systems: Proceedings of Selected AAS 2009 Papers, pp. 131-134 [Examiner cited art in related US matter with Notice of Allowance dated Aug. 11, 2016].
Lowe David G., "Fitting Parameterized Three-Dimensional Models to Images", IEEE Transaction on Pattern Analysis and Machine Intelligence, IEEE Computer Society, USA, vol. 13, No. 5, May 1, 1991, pp. 441-450.
Lloyd et al., "System for Monitoring the Condition of Packages Throughout Transit", U.S. Patent Application filed Sep. 25, 2015, 59 pages, not yet published., U.S. Appl. No. 14/865,575.
Leotta, Matthew, Generic, Deformable Models for 3-D Vehicle Surveillance, May 2010, Doctoral Dissertation, Brown University, Providence RI, 248 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Kazantsev, Aleksei et al. "Robust Pseudo-Random Coded Colored STructured Light Techniques for 30 Object Model Recovery"; ROSE 2008 IEEE International Workshop on Robotic and Sensors Environments (Oct. 17-18, 2008), 6 pages.
Jovanovski et al., "Image-Stitching for Dimensioning", U.S. Patent Application filed Sep. 30, 2015, 45 pages, not yet published., U.S. Appl. No. 14/870,488.
James Chamberlin, "System and Method for Picking Validation", U.S. Patent Application filed Sep. 25, 2015, 44 pages, not yet published, U.S. Appl. No. 14/865,797.
International Search Report for PCT/US2013/039438 (W02013166368), dated Oct. 1, 2013, 7 pages.
Intention to Grant in counterpart European Application No. 14157971.4 dated Apr. 14, 2015, pp. 1-8.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Hinske, Steve, "Determining the Position and Orientation of Multi-Tagged Objects Using RFID Technology," Fifth IEEE International Conference on Pervasive Computing and Communications Workshops, Mar. 19-23, 2007, pp. 377-381.
Advisory Action (PTOL-303) dated Feb. 1, 2018 for U.S. Appl. 13/786,131.
Advisory Action (PTOL-303) dated Sep. 29, 2016 for U.S. Appl. No. 13/786,131.
Applicant Initiated Interview Summary (PTOL-413) dated Aug. 29, 2018 for U.S. Appl. No. 13/786,131.
Notice of Allowance and Fees Due (PTOL-85) dated Mar. 5, 2019 for U.S. Appl. No. 13/786,131.
Notice of Allowance and Fees Due (PTOL-85) dated Mar. 14, 2019 for U.S. Appl. No. 13/786,131.
Notice of Allowance and Fees Due (PTOL-85) dated May 13, 2019 for U.S. Appl. No. 13/786,131.
Supplemental Notice of Allowability for U.S. Appl. No. 13/786,131 dated Mar. 14, 2019, 2 pages.
Supplemental Notice of Allowability for U.S. Appl. No. 13/786,131 dated Mar. 5, 2019, 2 pages.
Supplemental Notice of Allowability for U.S. Appl. No. 13/786,131 dated May 13, 2019, 2 pages.
U.S. Patent Application Franck Laffargue et al., filed Oct. 21, 2014, not published yet 34 pages., U.S. Appl. No. 14/519,233.
U.S. Patent Application for Web-Based Scan-Task Enabled System and Method of and Apparatus for Developing and Deploying the Same on a Client-Server Network filed Jul. 2, 2014 (Chen et al.); 65 pages, U.S. Appl. No. 14/370,237.
U.S. Patent Application for Variable Depth of Field Barcode Scanner filed Sep. 10, 2014 (McCloskey et al.); 29 pages, U.S. Appl. No. 14/483,056.
U.S. Patent Application for Tracking Batiery Conditions filed May 4, 2015 (Young et al.); 70 pages, U.S. Appl. No. 14/702,979.
U.S. Patent Application for Terminal Having Illumination and Focus Control filed May 21, 2014 (Liu et al.); 31 pages, U.S. Appl. No. 14/283,282.
U.S. Patent Application for Tactile Switch for a Mobile Electronic Device filed Jun. 16, 2015 (Barndringa); 38 pages, U.S. Appl. No. 14/740,320.
U.S. Patent Application for System for Communication via a Peripheral Hub filed Apr. 15, 2015 (Kohtz et al.); 37 pages, U.S. Appl. No. 14/687,289.
U.S. Patent Application for System and Method for Regulating Barcode Data Injection Into a Running Application on a Smart Device filed May 1, 2015 (Todeschini et al.); 38 pages, U.S. Appl. No. 14/702,110.
U.S. Patent Application for System and Method for Dimensioning filed Oct. 21, 2014 (Ackley et al.); 33 pages, U.S. Appl. No. 14/519,211.
U.S. Patent Application for System and Method for Detecting Barcode Printing Errors filed Jan. 14, 2015 (Ackley); 41 pages, U.S. Appl. No. 14/596,757.
U.S. Patent Application for Symbol Reading System With Integrated Scale Base filed Jul. 17, 2014 (Barten); 59 pages, U.S. Appl. No. 14/333,588.
U.S. Patent Application for Shelving and Package Locating Systems for Delivery Vehicles filed Jan. 6, 2015 (Payne); 31 pages, U.S. Appl. No. 14/590,024.
U.S. Patent Application for Self-Checkout Shopping System, filed Nov. 8, 2013 (Hejl et al.); 26 pages., U.S. Appl. No. 14/074,746.
U.S. Patent Application for Secure Unatiended Network Authentication filed Apr. 24, 2015 (Kubler et al.); 52 pages, U.S. Appl. No. 14/695,923.
U.S. Patent Application for Safety System and Method filed Dec. 22, 2014 (Ackley et al.); 32 pages, U.S. Appl. No. 14/578,627.
U.S. Patent Application for Reading Apparatus Having Partial Frame Operating Mode filed Apr. 21, 2014, (Barber et al.), 67 pages, U.S. Appl. No. 14/257,174.
U.S. Patent Application for Portable Electronic Devices Having a Separate Location Trigger Unit for Use in Controlling an Application Unit filed Nov. 3, 2014 (Bian et al.); 22 pages, U.S. Appl. No. 14/398,542.
U.S. Patent Application for Optimal Range Indicators for Bar Code Validation, filed Nov. 22, 2013 (Hejl); 27 pages., U.S. Appl. No. 14/087,190.
U.S. Patent Application for Optical Patie RN Projector filed Jun. 23, 2015 (Thuries et al.); 33 pages, U.S. Appl. No. 14/747,197.
U.S. Patent Application for Optical Indicia Reading Terminal with Combined Illumination filed Mar. 19, 2014 (Ouyang); 19 pages., U.S. Appl. No. 14/345,735.
U.S. Patent Application for Multipurpose Optical Reader, filed May 14, 2014 (Jovanovski et al.); 59 pages, U.S. Appl. No. 14/277,337.

(56) References Cited

OTHER PUBLICATIONS

U.S. Patent Application for Multifunction Point of Sale System filed Mar. 19, 2015 (Van Horn et al.); 41 pages, U.S. Appl. No. 14/662,922.
U.S. Patent Application for Multifunction Point of Sale Apparatus With Optical Signature Capture filed Jul. 30, 2014 (Good et al.); 37 pages, U.S. Appl. No. 14/446,391.
U.S. Patent Application for Mobile Printer With Optional Battery Accessory, filed May 12, 2014, (Marty et al.); 26 pages, U.S. Appl. No. 14/274,858.
U.S. Patent Application for Mobile Computing Device With Data Cognition Software, filed on Aug. 19, 2014 (Todeschini et al.); 38 pages, U.S. Appl. No. 14/462,801.
U.S. Patent Application for Methods for Training a Speech Recognition System filed Feb. 11, 2015 (Pecorari); 35 pages, U.S. Appl. No. 14/619,093.
U.S. Patent Application for Method of Using Camera Sensor Interface to Transfer Multiple Channels of Scan Data Using an Image Format filed Aug. 15, 2014 (Wang et al.); 28 pages, U.S. Appl. No. 14/379,057.
U.S. Patent Application for Method of and System for Detecting Object Weighing Interferences, filed Jul. 21, 2014 (Amundsen et al.); 34 pages, U.S. Appl. No. 14/336,188.
U.S. Patent Application for Method and System to Protect Software-Based Network-Connected Devices From Advanced Persistent Threat filed May 6, 2015 (Hussey et al.); 42 pages, U.S. Appl. No. 14/705,407.
U.S. Patent Application for Method and System for Recognizing Speech Using Wildcards in an Expected Response filed Oct. 29, 2014 (Braho et al.); 45 pages, U.S. Appl. No. 14/527,191.
U.S. Patent Application for Method and System for Considering Information About an Expected Response When Performing Speech Recognition, filed Jun. 10, 2014 (Braho et al.); 31 pages, U.S. Appl. No. 14/300,276.
U.S. Patent Application for Method and System for Configuring Mobile Devices via NFC Technology, filed Nov. 8, 2013 (Smith et al.); 28 pages., U.S. Appl. No. 14/074,787.
U.S. Patent Application for Method and Application for Scanning a Barcode With a Smart Device While Continuously Running and Displaying an Application on the Smart Device Display filed Mar. 20, 2015 (Todeschini); 37 pages, U.S. Appl. No. 14/664,063.
U.S. Patent Application for Medication Management System filed Apr. 24, 2015 (Sewell et al.); 44 pages, U.S. Appl. No. 14/695,364.
U.S. Patent Application for Media Gate for Thermal Transfer Printers filed Dec. 23, 2014 (Bowles); 36 pages, U.S. Appl. No. 14/580,262.
U.S. Patent Application for Indicia Reading Terminal Including Optical Filter filed Jan. 28, 2014 (Lu et al.); 29 pages, U.S. Appl. No. 14/166,103.
U.S. Patent Application for Indicia Reader, filed Oct. 14, 2013 (Huck); 29 pages., U.S. Appl. No. 14/053,314.
U.S. Patent Application for Indicia Reader for Size-Limited Applications filed Mar. 7, 2014 (Feng et al.); 42 pages, U.S. Appl. No. 14/200,405.
U.S. Patent Application for Incicia-reader Having Unitary Construction Scanner, filed Jan. 8, 2014 (Colavito et al.); 28 pages., U.S. Appl. No. 14/150,393.
U.S. Patent Application for Laser Scanning Code Symbol Reading System, filed Jul. 24, 2014 (Xian et al.); 39 pages, U.S. Appl. No. 14/339,708.
U.S. Patent Application for Laser Barcode Scanner, filed Jan. 14, 2014 (Hou et al.); 26 pages, U.S. Appl. No. 14/154,207.
U.S. Patent Application for Intermediate Linear Positioning filed May 5, 2015 (Charpentier et al.); 60 pages, U.S. Appl. No. 14/704,050.
U.S. Patent Application for Interactive Indicia Reader, filed Aug. 6, 2014, (Todeschini); 32 pages, U.S. Appl. No. 14/452,697.
U.S. Patent Application for Industrial Design for Consumer Device Based Scanning and Mobility, filed Jul. 2, 2014 (Ma et al.); 45 pages, U.S. Appl. No. 14/370,267.
U.S. Patent Application for Indicia-Reading Systems Having an Interface With a User's Nervous System filed Jun. 10, 2015 (Todeschini); 39 pages, U.S. Appl. No. 14/735,717.
U.S. Patent Application for Indicia Reading Terminal Processing Plurality of Frames of Image Data Responsively to Trigger Signal Activation filed Jul. 30, 2014 (Wang et al.); 76 pages, U.S. Appl. No. 14/446,387.
U.S. Patent Application for Indicia Reading System Employing Digital Gain Control filed Jun. 16, 2014 (Xian et al.); 53 pages, U.S. Appl. No. 14/305,153.
U.S. Patent Application for Imaging Based Barcode Scanner Engine with Multiple Elements Supported on a Common Printed Circuit Board filed Mar. 4, 2014 (Liu et al.); 27 pages, U.S. Appl. No. 14/342,544.
U.S. Patent Application for Identifying Inventory Items in a Storage Facility filed Oct. 14, 2014 (Singel et al.); 51 pages, U.S. Appl. No. 14/513,808.
U.S. Patent Application for Hybrid System and Method for Reading Indicia, filed Oct. 29, 2013 (Meier et al.); 22 pages., U.S. Appl. No. 14/065,768.

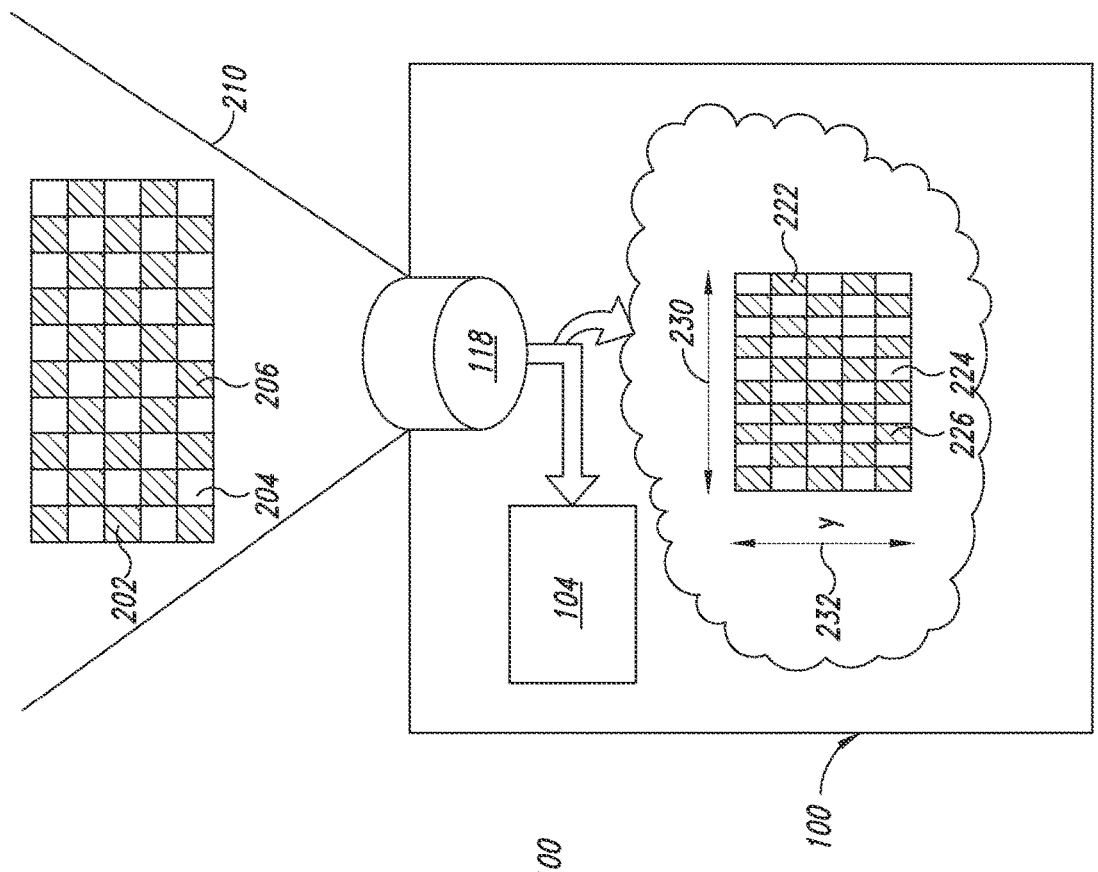
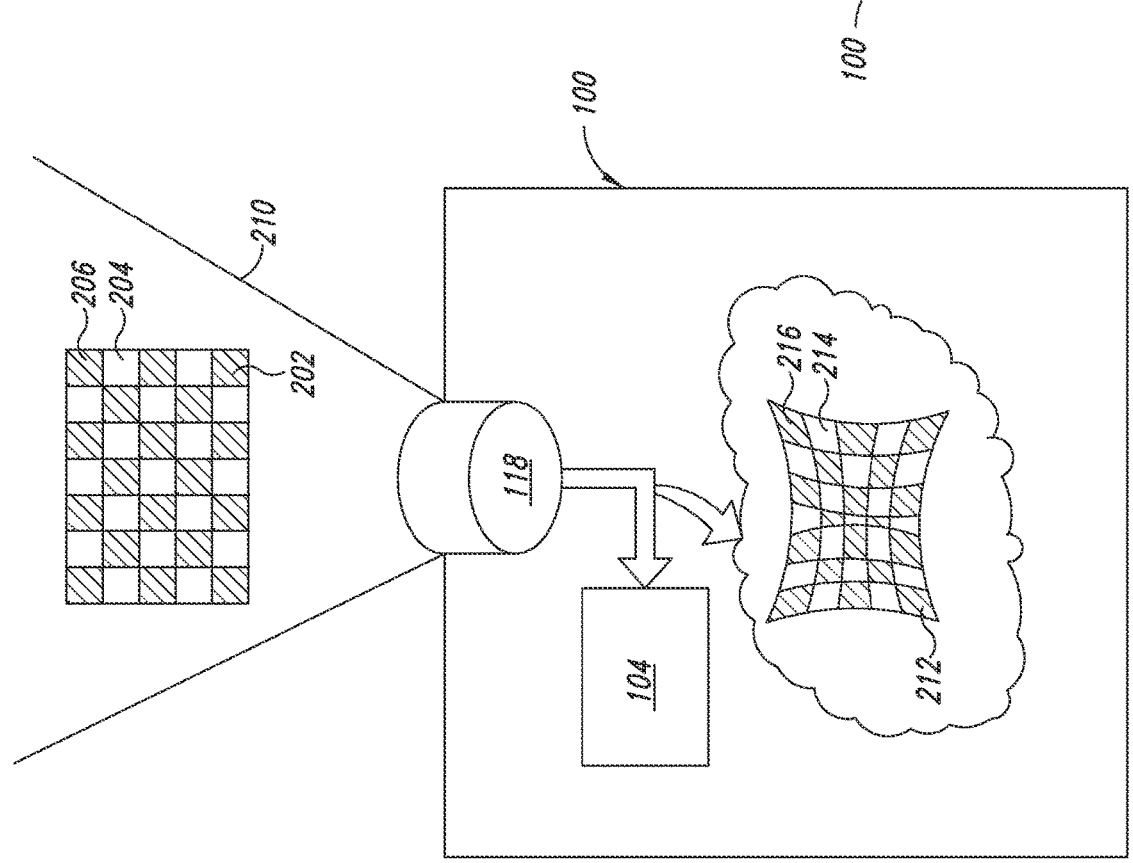

VOLUME DIMENSIONING SYSTEM CALIBRATION SYSTEMS AND METHODS

CROSS-REFERENCE TO RELATED APPLICATIONS

This application is a continuation of U.S. application Ser. No. 13/786,131, filed Mar. 5, 2013, which claims the benefit of U.S. Provisional Application No. 61/691,093, filed Aug. 20, 2012, each of which are incorporated herein by reference in its entirety.

BACKGROUND

Field

This disclosure generally relates to volume dimensioning systems, and particularly to systems and methods useful in the promoting compliance with governmental or industry standard calibration guidelines.

Description of the Related Art

Volume dimensioning systems are useful for providing dimensional and/or volumetric information related to three-dimensional objects. The objects may, for example take the form of parcels or packages intended for transit via a carrier (e.g., courier) or other items intended for transit. Dimensional and/or volumetric information is useful for example, in providing users with accurate shipping rates based on the actual size and/or volume of the object being shipped. Dimensional and/or volumetric information may be used by the carrier in selecting and scheduling appropriately sized vehicles and/or delivery routes. The ready availability of dimensional and/or volumetric information for all objects within a carrier's network assists the carrier in ensuring optimal use of available space in the many different vehicles and containers used in local, interstate, and international shipping.

Such may be of particular significant in today's economy where many businesses rely on "just in time" manufacturing. Typically, every supplier in the supply chain must be able to ship necessary components or resources on demand or with very little lead time. Thus, efficient handling of cargo is required. It does a supplier no good to have the desired goods on hand, if the supplier cannot readily ship the desired goods.

Automating volume dimensioning can speed parcel intake, improve the overall level of billing accuracy, and increase the efficiency of cargo handling. Unfortunately, parcels are not confined to a standard size or shape, and may, in fact, have virtually any size or shape. Additionally, parcels may also have specialized shipping and/or handling instructions (e.g., fragile, this side up) that must be followed during shipping or handling to protect the objects during shipping.

Volume dimensioning devices are used throughout the package delivery and carriage industry to provide a rapid way of measuring the overall dimensions of an object and, in some instances, to provide shipping rates for the object based on one or more classes of service. Historically, shipping rates were principally a function of an object's weight—heavier objects were assigned higher shipping costs than lighter objects. However, such a costing system failed to appreciate that volume the volume occupied by an object also impacted shipping costs since vehicles were not just limited in gross vehicle weight, but internal volume as well. As a consequence shippers began establishing shipping rates using both volume and weight as factors considered in determining the ultimate shipping rate charged to a customer.

The concept of volume dimensioning factors the shipping volume of an object into the overall shipping cost of an object. Thus, objects having a relatively light weight but a relatively large physical volume may have a shipping cost that exceeds the shipping cost of a physically smaller, but heavier, object. The use of volume in determining shipping costs increased the labor associated with package intake, since objects could no longer simply be weighed and a cost assigned. Instead, to accurately obtain a volume dimension, multiple dimensional measurements were taken and used to determine the volume of the object. Once the volume is determined, a shipping cost is assigned based on the measured volume and/or weight of the object. Thus, the shipping cost charged a customer is a function of the weight of an object, the volume occupied by the object, or both the weight of and the volume occupied by the object. Automated volume dimensioning systems have replaced the laborious and error prone derivation of an object's volume by manually obtaining multiple linear dimensions (e.g., the length, width, height, girth, etc.) of an object. The accuracy of a quoted shipping rate is thus dependent upon the accuracy with which an object can be dimensioned using a volume dimensioning system.

There exists a need for new dimensioning systems that may accurately perform volume dimensioning of objects including parcels and packages as well as other objects.

BRIEF SUMMARY

The Applicants have developed systems and methods useful for adjusting the reported or displayed dimensional measurement accuracy and consequently the reported or displayed shipping or cartage rate obtained using dimensional or volumetric data supplied by the volume dimensioning system. The systems and methods described herein take into consideration the level of distortion (e.g., dimensional distortion, optical distortion, etc.) present in the image data provided by such automated volume dimensioning systems. In some instances, the system adjusts a dimensional accuracy of a representation of volume dimensioning information (e.g., dimensions, cost based on the measured distortion present in the volume dimensioning system). Such may ensure that the dimensional and shipping cost data generated by the system is determined using the finest units of accuracy achievable given the current system operational parameters to reliably provide the most accurate shipping or cartage costs. Such systems and methods can be used to promote or facilitate volume dimensioning system compliance with corporate, industry, or regulatory standards, best practices, or guidelines, for example National Institute of Standards (NIST) Handbook 44-2012 Chapter 5.58—"Multiple Dimension Measuring Devices".

The systems and methods disclosed herein also facilitate the ongoing, operationally transparent, calibration of volume dimensioning systems. Such ongoing calibrations provide system users and consumers with a degree of confidence in the dimensional and shipping cost data provided by the volume dimensioning system and also provide an early indication that the system calibration can no longer be brought into compliance with corporate, industry, or regulatory standards, best practices, or guidelines.

A volume dimensioning system may be summarized as including at least one image sensor that provides image data representative of a number of images of a field of view of the at least one image sensor; and a control subsystem communicatively coupled to the at least one image sensor to receive the image data therefrom, the control subsystem including at least one nontransitory storage medium and at least one processor, the at least one nontransitory storage medium which stores at least one of information or processor executable instructions; and the at least one processor which: determines at least one distortion value indicative of an amount of distortion in the images based at least in part on at least a portion of a calibration pattern which appears in the field of view of the at least one image sensor in at least a portion of some of the images, the calibration pattern having a set of defined characteristics; assesses the at least one distortion value relative to a number of distortion threshold values; and adjusts a unit of accuracy in a representation of volume dimensioning related information based at least in part on the assessment of the at least one distortion value relative to the distortion threshold values.

The at least one processor may determine the at least one distortion value as at least one set of optical distortion values and at least one set of dimensional distortion values, the set of optical distortion values representative of an optical contribution to distortion in the image data and the set of dimensional distortion values representative of a dimensional contribution to distortion in the image data. The at least one processor may assess the at least one distortion value relative to a recalibration threshold value that represents distortion correctable via a self recalibration by the volume dimensioning system. The at least one processor may assess the at least one distortion value relative to a service required threshold value that represents distortion that can only be corrected via a servicing of the volume dimensioning system by a service technician. The at least one processor may adjust the unit of accuracy in the representation of volume dimensioning related information in response to an assessment that the at least one distortion value exceeds the recalibration threshold value and is below the service required threshold value. Responsive to the determination that the at least one distortion value is less than the recalibration threshold value, the at least one processor may recalibrate the volume dimensioning system to a fine unit of accuracy; and wherein responsive to the determination that the at least one distortion value exceeds the recalibration threshold value and is below the service required threshold value, the at least one processor may recalibrate the volume dimensioning system to a coarse unit of accuracy. The processor may further produce an alert in response to an assessment that the at least one distortion value exceeds the service required threshold value. The processor may further determine at least one of a set of calculated optical distortion correction factors or a set of calculated dimensional correction factors in response to an assessment that the at least one distortion value is within the recalibration threshold value and wherein the processor may further apply at least one of the set of calculated optical distortion correction factors or the set of calculated dimensional correction factors to the image data in determining the volume dimensioning related information. The processor may adjust a decimal place represented to adjust the unit of accuracy in the representation of volume dimensioning related information. The processor may adjust a dimensional unit of measurement represented to adjust the unit of accuracy in the representation of volume dimensioning related information. The processor may adjust a unit of currency represented to adjust the unit of accuracy in the representation of volume dimensioning related information. The volume dimensioning system may further include an illumination subsystem communicably coupled to the control subsystem, the illumination subsystem to at least partially illuminate the calibration pattern. The volume dimensioning system may further include a support structure to receive at least the at least one image sensor such that when the at least one image sensor is received by the support structure at least a portion of the pattern is within a field of view of the at least one image sensor. The system may be fixed or hand held. The at least one distortion value may be associated with at least one of data indicative of a date or data indicative of a time and wherein the at least one distortion value and the respective associated data indicative of a date or data indicative of a time may be stored in the non-transitory storage medium.

A volume dimensioning method may be summarized as including receiving by at least one dimensioning system processor image data representative of a number of images in a field of view of at least one image sensor; determining by the at least one dimensioning system processor at least one distortion value indicative of an amount of distortion in the images based at least in part on at least a portion of a calibration pattern which appears in the field of view of the at least one image sensor in at least some of the images, the calibration pattern having a set of defined characteristics; assessing by the at least one dimensioning system processor the at least one distortion value relative to a number of distortion threshold values stored in a non-transitory storage medium communicably coupled to the at least one dimensioning system processor; and adjusting by the at least one dimensioning system processor a unit of accuracy in a representation of volume dimensioning related information based at least in part on the assessment of the at least one distortion value relative to the distortion threshold values.

Assessing by the at least one dimensioning system processor the at least one distortion value relative to a number of distortion threshold values may include determining the at least one distortion value as at least one set of optical distortion values and at least one set of dimensional distortion values; wherein the set of optical distortion values represents an optical contribution to distortion in the image data; and wherein the set of dimensional distortion values represent a dimensional contribution to distortion in the image data. Assessing by the at least one dimensioning system processor the at least one distortion value relative to a number of distortion threshold values may include assessing the at least one distortion value relative to a recalibration threshold value representing distortion correctable via a recalibration of the volume dimensioning system. Assessing by the at least one dimensioning system processor the at least one distortion value relative to a number of distortion threshold values may include assessing the at least one distortion value relative to a service required threshold value representing distortion not correctable via recalibration of the volume dimensioning system. Assessing by the at least one dimensioning system processor the at least one distortion value relative to a number of distortion threshold values may include assessing the at least one distortion value to fall between the recalibration threshold value and the service required threshold value, representing distortion correctable via a recalibration of the volume dimensioning system. Adjusting a unit of accuracy in a representation of volume dimensioning related information based at least in part on the assessment of the at least one distortion value relative to the distortion threshold values may include recalibrating the volume dimensioning system to a fine unit of accuracy responsive to an assessment that the at least one distortion value relative to the recalibration threshold value indicates a distortion correctable via recalibration; recalibrating the volume dimensioning system to a coarse unit of accuracy responsive to an assessment that the at least one distortion value falls between the recalibration threshold value and the service required threshold value; and generating an alert responsive to an assessment that the at least one distortion value relative to the service required threshold value indicates a distortion not correctable via recalibration. The volume dimensioning method may further include, responsive to the determination that the at least one distortion value is within the recalibration threshold value, determining by the at least one dimensioning system processor at least one of a set of calculated optical distortion correction factors or a set of calculated dimensional correction factors; and applying at least one of the set of calculated optical distortion correction factors or the set of calculated dimensional correction factors to the image data in determining the volume dimensioning related information.

A volume dimensioning controller may be summarized as including at least one input communicably coupled to at least one processor, the at least one input to receive image data representative of a number of images of a field of view of at least one image sensor; and at least one processor communicably coupled to the at least one non-transitory storage medium, the at least one processor to: determine at least one distortion value indicative of an amount of distortion in the images based at least in part on at least a portion of a calibration pattern which appears in the field of view of the at least one image sensor in at least some of the images, the calibration pattern having a set of defined characteristics; assess the at least one distortion value relative to a number of distortion threshold values stored in the non-transitory storage medium; and adjust a unit of accuracy in a representation of volume dimensioning related information based at least in part on the assessment of the at least one distortion value relative to the distortion threshold values.

The at least one processor may determine the at least one distortion value as at least one set of optical distortion values and at least one set of dimensional distortion values, the set of optical distortion values representative of an optical contribution to distortion in the image data and the set of dimensional distortion values representative of a dimensional contribution to distortion in the image data. The at least one processor may assess the at least one distortion value relative to a recalibration threshold value that represents distortion correctable via a self recalibration by the volume dimensioning system. The at least one processor may assess the at least one distortion value relative to a service required threshold value that represents distortion that can only be corrected via a servicing of the volume dimensioning system by a service technician. The at least one processor may adjust the unit of accuracy in the representation of volume dimensioning related information in response to an assessment that the at least one distortion value exceeds the recalibration threshold value and is below the service required threshold value. Responsive to the determination that the at least one distortion value is less than the recalibration threshold value, the at least one processor may recalibrate the volume dimensioning system to a fine unit of accuracy; and wherein responsive to the determination that the at least one distortion value exceeds the recalibration threshold value and is below the service required threshold value, the at least one processor may recalibrate the volume dimensioning system to a coarse unit of accuracy.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 2A is a perspective view of a volume dimensioning system displaying one example of the effects of optical distortion, according to one illustrative embodiment.

FIG. 2B is a perspective view of a volume dimensioning system displaying one example of the effects of dimensional distortion, according to one illustrative embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with volume dimensioning systems, correction of optical and dimensional distortion in single and compound lens devices, wired, wireless and optical communications systems, and/or automatic data collection (ADC) readers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

Figure 1:
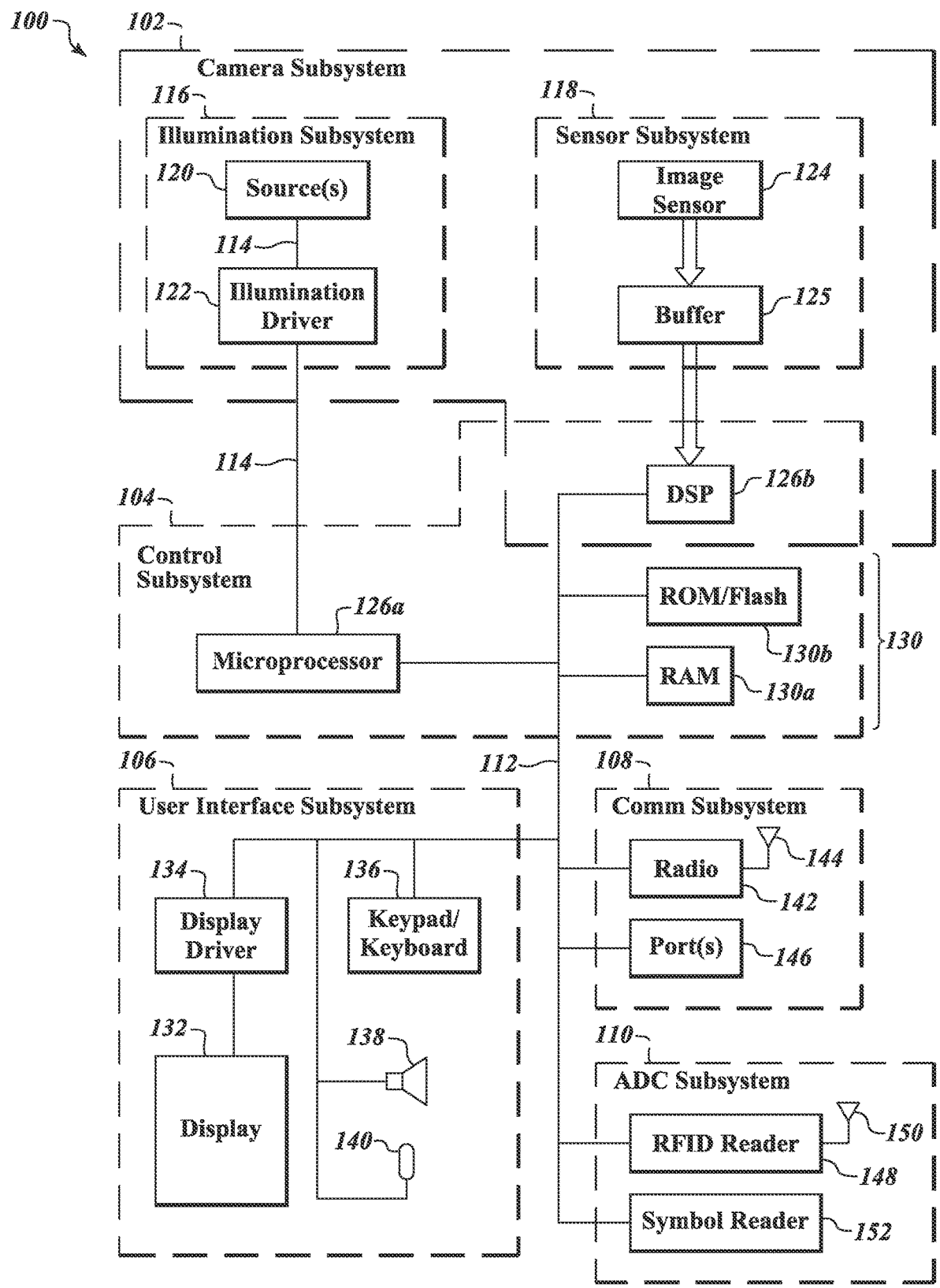
FIG. 1 is a block diagram of an example volume dimensioning system, according to one illustrated embodiment.

FIG. 1 shows a volume dimensioning system 100, according to one illustrated embodiment.

The volume dimensioning system 100 includes a camera subsystem 102 and control subsystem 104. The volume dimensioning system 100 optionally includes one or more of: a user interface (UI) subsystem 106; a communications subsystem 108 and/or an automatic data collection (ADC) subsystem 110.

The various subsystems 102-110 may be communicatively coupled by one or more couplers (e.g., electrically conductive paths, wires, optical fibers), for example via one or more buses 112 (only one shown) and/or control lines 114 (only two shown). The buses 112, or other couplers, may include power buses or lines, data buses, instruction buses, address buses, etc., which allow operation of the various subsystems 102-110 and interaction or intercommunication therebetween. The various subsystems 102-110 are each discussed in turn, below. While various individual components are generally easily categorizable into one or another of the subsystems, some components may be optionally implemented in one or two or more of the subsystems 102-110. Thus, some components may be illustrated in FIG. 1 as part of two or more subsystems 102-110. Alternatively, some of the components illustrated in FIG. 1 as discrete components in two or more subsystems 102-110 may be present as a single component within a single subsystem 102-110.

The camera subsystem 102 includes an optional illumination subsystem 116 to provide or emit electromagnetic illumination outward from the volume dimensioning system 100 into an environment containing a target object (not shown in FIG. 1) and a sensor subsystem 118 to receive illumination returned (e.g., reflected, fluoresced) from at least the target object.

The illumination subsystem 116 includes an illumination device 120. The illumination device 120 may take the form of an array of individually addressable or controllable elements, and also may have a variety of forms capable of producing electromagnetic energy having a spectral content useful for image collection by the sensor subsystem 118. The illumination subsystem 116 will typically include an illumination driver 122 which is coupled to control the individually addressable or controllable elements of the illumination device 120. Alternatively, the illumination device 120 may be controlled directly by the control subsystem 104 without the use of a dedicated illumination driver 122.

In particular, the illumination device 120 is controlled to produce or emit modulated electromagnetic energy in a number of wavelengths or ranges of wavelengths. For instance, illumination may include electromagnetic energy of wavelengths in an optical range or portion of the electromagnetic spectrum including wavelengths in a human-visible range or portion (e.g., approximately 390 nm-750 nm) and/or wavelengths in the near-infrared (NIR) (e.g., approximately 750 nm-1400 nm) or infrared (e.g., approximately 750 nm-1 mm) portions and/or the near-ultraviolet (NUV) (e.g., approximately 400 nm-300 nm) or ultraviolet (e.g., approximately 400 nm-122 nm) portions of the electromagnetic spectrum. The particular wavelengths are exemplary and not meant to be limiting. Other wavelengths of electromagnetic energy may be employed.

The sensor subsystem 118 includes an image transducer or image sensor 124, typically a two-dimensional array of photo-sensitive or photo-responsive elements, for instance a two-dimensional array of photodiodes or a two-dimensional array of charge coupled devices (CODs). The sensor subsystem 118 may optionally include a buffer 125 communicatively coupled to the image sensor 124 to receive or otherwise acquire image data measured, captured or otherwise sensed or acquired by the image sensor 124. The buffer 125 may comprise a non-transitory storage medium capable of temporarily storing image data until the image data is further processed by the volume dimensioning system 100. In at least some instances, the sensor subsystem 118 can include one or more sensors, systems, or devices for reading or scanning one or more optical machine readable symbols or radio frequency machine readable devices such as radio frequency identification (RFID) tags. Some possibly suitable systems are described in U.S. patent application Ser. No. 12/638,616, filed Dec. 15, 2009 and published as U.S. patent application publication no. US 2010-0220894, which is incorporated by reference herein in its entirety to the extent the subject matter therein does not contradict or conflict with the subject matter of the instant application.

The sensor subsystem may further include one or more distance determination sensors (not shown in FIG. 1) useful in measuring or otherwise determining the distance between the volume dimensioning system 100 and one or more objects within the field of view of the image sensor 124. Such distance detection sensors can include one or more time-of-flight sensors, sonar sensors, or similar. In at least some instances the image sensor 124 may advantageously include one or more distance determination features, for example parallax measured across all or a portion of the image sensor 124.

The control subsystem 104 includes one or more processors 126, for example one or more microprocessors (one shown) 126a, digital signal processors (DSP—one shown) 126b, application specific integrated circuits (ASIC), programmable gate arrays (PGA), programmable logic controllers (PLC), or the like. While the DSP 126b may be considered or provided or packaged as part of the control subsystem 104, the DSP 126b may in some applications be may be considered or provided or packaged as part of the camera subsystem 102.

The control subsystem 104 includes at least one non-transitory storage media 130. For example, the control subsystem 104 may include nonvolatile memory, for instance read only memory (ROM) or NAND Flash memory 130a. Additionally or alternatively, all or a portion of the at least one non-transitory storage media 130 may include volatile memory, for instance dynamic random access memory (ROM) 130b. The at least one non-transitory storage media 130 may store one or more computer- or processor-executable instructions or data, useful in causing the microprocessor, DSP or other microcontroller to perform dimensional functions, volumetric functions, volume dimensioning functions, shipping cost calculation functions, or combinations thereof, for example by executing the various methods described herein.

In some instances the at least one non-transitory storage media 130 may store or otherwise retain a number of distortion values indicative of the quantitative or qualitative degree of distortion present in the image data provided by the volume dimensioning system 100. Such distortion may be present as an optical distortion, a dimensional distortion, or any other type of distortion including chromatic distortion that causes deviations between the image data and the scene within the field of view of the sensor subsystem 118. In yet other instances, the at least one non-transitory storage media 130 may store or otherwise retain a plurality of historical distortion values, such as a plurality of optical or dimensional distortion values that permit the historical trending of the optical or dimensional distortion values. Such historical data can also play a helpful role in demonstrating an ongoing compliance with one or more corporate, industry, or regulatory guidelines, best practices, or standards. In at least some instances, the at least one non-transitory storage media 130 can store or otherwise retain one or more sets of distortion correction factors useful in reducing or eliminating one or more forms of distortion present in the image data provided by the volume dimensioning system 100.

The optional UI subsystem 106 may include one or more user interface components which provide information to a user or allow a user to input information or control operation of the volume dimensioning system 100.

For example, the UI subsystem 106 may include a display 132 to visually provide information or control elements to the user. The display 132 may, for example, take the form of a liquid crystal display (LCD) panel. The display 132 may, for example, take the form of a touch sensitive display, allowing the display of user selectable icons (e.g., virtual keypad or keyboard, graphical user interface or GUI elements) in addition to the display of information. The display 132 may be coupled to the control subsystem 104 via a display driver 134 or similar component. The display driver 134 may control the presentation of information and icons on the display 132. The display driver 134 may additionally process signals indicative of user inputs made via the display 132.

The UI subsystem 106 may optionally include a physical keypad or keyboard 136, which allows a user to enter data and instructions or commands. The physical keypad or keyboard 136 may be integral to a housing (not shown) of the volume dimensioning system 100. Alternatively, the optional physical keypad or keyboard 136 may be separate from the housing, communicatively coupled thereto via a wireless connection or wired connection for instance a Universal Serial Bus (USB®) interface.

The UI subsystem 106 may optionally include a speaker 138 to provide audible information, cues and/or alerts to a user. The UI subsystem 106 may optionally include a microphone 140 to receive spoken information, instructions or commands from a user.

The communications subsystem 108 may include one or more wireless communications components and/or one or more wired communications components to allow communications with devices external from the volume dimensioning system 100.

For example the communications subsystem 108 may include one or more radios (e.g., transmitters, receivers, transceivers) 142 and associated antenna(s) 144. The radio(s) 142 may take any of a large variety of forms using any of a large variety of communications protocols, for instance IEEE 802.11, including WI-FI®, BLUETOOTH®, various cellular protocols for instance CDMA, TDMA, EDGE®, 3G, 4G, GSM.

Also for example, the communications subsystem 108 may include one or more communications ports 146. The communications ports 146 may take any of a large variety of forms, for example wired communications ports for instance ETHERNET® ports, USB® ports, FIREWIRE® ports, THUNDERBOLT® ports, etc. The communications ports 146 may even take the form of wireless ports, for instance an optical or radio frequency transceiver.

The ADC subsystem 110 may include one or more ADC readers to perform automatic data collection activities, for instance with respect to a target object.

For example, the ADC subsystem 110 may include a radio frequency identification (RFID) reader or interrogator 148 and associated antenna 150 to wireless read and/or write to wireless transponders (e.g., RFID tags or transponders) (not shown). Any of a large variety of RFID readers or interrogators 148 may be employed, including fixed or stationary RFID readers or portable or handheld RFID readers. RFID reader(s) 148 may be used to read information from a transponder physically or at least proximally associated with a target object (not shown in FIG. 1). Such information may, for instance, include recipient information including an address and/or telephone number, sender information including an address and/or telephone number, specific handling instructions (e.g., fragile, keep a give side up, temperature range, security information). The RFID reader 148 may also write information to the transponder, for instance information indicative of a time and/or place at which the transponder was read, creating a tracking record.

Also for example, the ADC subsystem 110 may include a machine-readable symbol reader 152 to wireless read machine-readable symbols (e.g., one-dimensional or barcode symbols, two-dimensional or matrix code symbols) (not shown). Any of a large variety of machine-readable symbol readers 152 may be employed. For example, such may employ scanner based machine-readable symbol readers 152 such as those that scan a point of light (e.g., laser) across a symbol and detector light returned from the symbol, and decoding information encoded in the symbol. Also for example, such may employ imager based machine-readable symbol readers 152 such as those that employ flood illumination (e.g., LEDs) of a symbol, detect or capture an image of the symbol, and decode information encoded in the symbol. The machine-readable symbol reader(s) 152 may include fixed or stationary machine-readable symbol readers or portable or handheld machine-readable symbol readers. The machine-readable symbol reader(s) 152 may be used to read information from a machine-readable symbol physically or at least proximally associated with a target object. Such information may, for instance, include recipient information including an address and/or telephone number, sender information including an address and/or telephone number, specific handling instructions (e.g., fragile, keep a give side up, temperature range, security information).

While not illustrated, the volume dimensioning system 100 may include a self contained, discrete source of power, for example one or more chemical battery cells, ultracapacitor cells and/or fuel cells. While also not illustrated, the volume dimensioning system 100 may include a recharging circuit, for example to recharge secondary chemical battery cells. Alternatively or additionally, the volume dimensioning system 100 may be wired to an external power source, such as mains, residential or commercial power.

FIGS. 2A and 2B illustrate different types of distortion visible as a deviation between the pattern image data 212, 222 within the respective systems 100 when compared the calibration or reference pattern 202. The reference pattern 202 is disposed within the field of view 210 of the at least one image sensor 124 and comprises alternating squares of white areas 204 and color areas 206.

The dimensions of the reference pattern 202 are defined, fixed, and known by the volume dimensioning system 100 prior to imaging. This allows the volume dimensioning system 100 to analyze pattern image data 212, 222 containing at least a portion of the reference pattern 202 to assess or quantify the distortion present in the image and to generate at least one distortion value indicative of the distortion. The distortion may be global throughout the image or may be localized with different portions of the image exhibiting different types or amounts of distortion.

FIG. 2A illustrates the effect of an optical distortion that renders the image with a "pincushion" distortion where the white and colored squares 204, 206 in the original pattern 202 are reproduced in the pattern image data 212 as generally diamond shaped white and colored areas 214, 216, respectively. Although the pincushion distortion illustrated in FIG. 2A is exaggerated, it can be appreciated that any such or similar optical distortion may adversely affect to some degree the volume dimensioning system's ability to accurately determine dimensional and volumetric data. Such inaccurate dimensional and volumetric data can adversely affect the system's ability to provide accurate shipping volumes and shipping rates to carriers and consumers.

FIG. 2B illustrates the effect of a dimensional distortion along a single (horizontal) axis where the white and colored squares 204, 206 in the reference pattern 202 are reproduced in the pattern image data 222 as generally rectangular shaped white and colored areas 224, 226, respectively. Disproportionate compression of the image data along one axis (e.g., along the x-axis 230 in FIG. 2B) causes the dimensional distortion seen in the pattern image data 222. Conversely, disproportionate extension of the image data along two or more axes may result in both dimensional and geometric distortion of the reference pattern 202. Although the dimensional distortion appearing in FIG. 2B is exaggerated, it can be appreciated that any such or similar dimensional or geometric distortion can also adversely affect the volume dimensioning system's ability to accurately determine dimensional and volumetric data. Such inaccurate dimensional and volumetric data can adversely affect the system's ability to provide accurate shipping volumes and shipping rates to carriers and consumers.

Although shown in two different figures for clarity and ease of discussion, optical and dimensional distortion, along with other forms of distortion such as color or chromatic aberration or distortion, may appear in image data produced by a volume dimensioning system 100. Such combinations further complicate the accurate determination of dimensional or volumetric information therefrom. Uncorrected, such optical and dimensional distortion in the image can cause the calculation or propagation of erroneous dimensional information and consequently volumetric information and volume-based shipping cost information.

Optical distortion may be present in the image data received from the sensor subsystem 118 in many forms. Typical forms of optical distortion present in image data can include radial distortion, chromatic or spherical aberration, linear distortion, geometric distortion, and combinations thereof. Such optical distortion may not necessarily be a consequence of a latent defect in the sensor subsystem 118 but may be inherent in the design or manufacture of the optics used to provide the sensor subsystem 118 or characteristic of the image processing hardware, firmware, or software employed by the volume dimensioning system 100. Such optical distortion may variously be referred to as pincushion distortion, barrel distortion, or mustache distortion depending on the visual appearance of the distortion present in the displayed pattern image data 212, 222. Regardless of the cause, the presence of distortion in the image data compromises the ability of the volume dimensioning system 100 to accurately determine dimensional or volumetric data for an object. Uncorrected, such optical and dimensional distortion may adversely impact the accuracy of the shipping costs provided by the volume dimensioning system 100 and also may hinder a shipper's ability to schedule and load shipping containers, trucks, railcars, or the like based on the dimensional and volumetric data.

In some instances, optical distortion may be present but non-uniformly distributed across an image. Such distortion may result in a portion of an image suffering little or no optical distortion while other portions of the same image suffer significant distortion. For example, little optical distortion may be present in the center portion of an image while all or a portion of the periphery of the same image may suffer a much greater degree of optical distortion. In other instances a first type of distortion may be distributed more-or-less uniformly across the image while a second type of distortion may be present in one or more localized areas. In yet other instances, an object of dimensional interest may lie within only a portion of an optically distorted image captured by the image sensor. In such instances, it may be advantageous to locally correct the distortion present in the area of the image in which the object of dimensional interest lies. In at least some instances, if the type and extent of such local distortion present in an image can be assessed or is of a known type, extent, and/or magnitude, then local dimensional correction may be possible within the image. The ability to locally correct distortion present in an image advantageously eliminates the application of such distortion correction in portions of the image having where such distortion is not present.

Although the reference pattern 202 is depicted as a checkerboard, any number of machine recognizable indicia including one or more machine-readable symbols, machine-readable patterns, calibration patterns, calibration targets, calibration points, or the like may be similarly employed as a tool for assessing the distortion (e.g., amount, type, location) present in the image data. Physical parameters associated with the reference pattern 202 can be provided to the volume dimensioning system 100 either as one or more factory settings (e.g., preloaded values placed into the read only portion of the non-transitory storage medium) or communicated to the volume dimensioning system (e.g., via a network, Bluetooth, or similar connection). All or a portion of such physical parameters may include color information associated with the reference pattern 202 including the overall reference pattern size, the size of the white areas 204, the size of the colored areas 206, or combinations thereof. All or a portion of such physical parameters may include the spatial or geometric relationship between the various white and colored areas 204, 206 in the reference pattern 202. All or a portion of such physical parameters may include information encoded into one or more regions or portions of the reference pattern 202 in the form of one or more machine readable indicia or symbols. Pattern image data 212, 214 is used by the at least one processor 126 to detect and quantify the distortion (e.g., optical or dimensional distortion) present in the image data using the one or more known physical parameters. The quantity of distortion present may be expressed as at least one distortion value. In at least some instances, all or a portion of the reference pattern 202 may be useful in calibrating the volume dimensioning system 100.

In at least some instances, the entire electromagnetic spectrum reflected or otherwise returned from the reference pattern 202 may be used by the at least one processor 126 to determine all or a portion of the at least one distortion value. In other instances, only a portion of the electromagnetic spectrum reflected or otherwise returned from the reference pattern 202 may be used by the at least one processor 126 to determine the at least one distortion value. In some instances, the reference pattern 202 may return pattern image data unique to the electromagnetic spectrum illuminating the reference pattern 202 (e.g., the pattern image data returned in a near-ultraviolet spectrum may differ from that returned in a visible spectrum). Portions of the electromagnetic spectrum used by the at least one processor 126 may include, but are not limited to, the near ultraviolet portion of the electromagnetic spectrum, the near infrared portion of the electromagnetic spectrum, one or more portions of the visible electromagnetic spectrum, or any portion of combination thereof.

Although the entire reference pattern 202 is shown within the field of view 210 of the image sensor 124 in both FIGS. 2A and 2B, only a portion of the reference pattern 202 need be within the field of view 210 of the image sensor 124 to permit the at least one processor 126 to determine the at least one distortion value indicative of the distortion present in the pattern image data 212, 222. Additionally, only a portion of the reference pattern 202 need be within the field of view 210 of the image sensor 124 to permit the at least one processor 126 to determine a number of sets of distortion correction factors (e.g., one or more sets of optical or dimensional distortion correction factors) that are useful in reducing or eliminating the effect of distortion on the accuracy of dimensional, volumetric, volume dimensioning or cost data provided by the volume dimensioning system 100.

Identification data may in some instances be created, generated or otherwise provided by the at least one processor 126 and associated with the at least one determined distortion value. Such identification data may include chronological data such as data indicative of the date or the time at which the at least one distortion value was obtained, calculated, or otherwise determined by the at least one processor 126. Such identification data may include chronological data such as data indicative of the date or the time at which one or more sets of distortion correction factors are determined by the at least one processor 126. Such identification data may include chronological data associated with system events (e.g., distortion value determination, distortion correction determination, system calibration, a change in system units of accuracy, a change in system configuration, etc.) that are recommended or required for compliance with one or more corporate, industry, or regulatory guidelines, best practices, or standards.

The determined at least one distortion value along with the respective associated identification data may be at least partially stored in the at least one non-transitory storage media 130. Maintaining a history of the determined at least one distortion value may advantageously provide the ability for the one or more processors 126 to predict expected future distortion values and to detect sudden or unexpected changes in the level or magnitude of the determined at least one distortion value. Sudden changes in the at least one distortion value may, for example, indicate an unexpected change in performance of the volume dimensioning system 100. The ability to predict future expected distortion values may, for example, be useful in providing a predicted replacement interval or an expected remaining service life for the volume dimensioning system 100.

In at least some instances, the volume dimensioning system 100 can generate an output that includes both identification data and the associated at least one distortion value either as a visible output on user interface 132 or as a data output transmitted via the communication subsystem 108 to an external device such as a non-transitory data storage location on a local network or in the cloud or an external display device such as a printer or similar data output device.

At least some instances, the at least one processor 126 can calculate or otherwise determine one or more sets of distortion correction factors (e.g., one or more sets of optical distortion factors or one or more sets of dimensional distortion factors) based in whole or in part on the determined at least one distortion value. When within a first set of distortion threshold values, the volume dimensioning system 100 may use the distortion correction factors to reduce or even eliminate the effects of distortion, improving the dimensional, volumetric, and resultant shipping cost calculation capabilities of the volume dimensioning system 100.

The at least one processor 126 may determine the distortion correction factors using one or more numerical distortion correction methods. Numerical distortion correction methods may, for example, include Brown's distortion model or other similar mathematical distortion correction methods or schemes. One or more graphical distortion correction methods may also be used alone or in cooperation with one or more numerical distortion correction methods.

In some instances, the at least one processor 126 may use the entire electromagnetic spectrum of the image provided by the sensor subsystem 118 to determine all or a portion of the one or more distortion correction factors. In other instances, the at least one processor may use a portion of the electromagnetic spectrum of the image provided by the sensor subsystem 118 to determine the one or more distortion correction factors. The use of sets of distortion correction factors in one or more portions of the electromagnetic spectrum may in some instances advantageously provide the ability to partially or completely correct at least a portion of the chromatic aberration present in the image data provided by the sensor subsystem 118.

Dimensional distortion such as that shown in FIG. 2B may cause the generally square areas of one color (e.g., white 214) and areas of a second color (e.g., black 216) within the reference pattern 202 to appear as compressed rectangular or trapezoidal areas in the pattern image data 222. Such dimensional or geometric distortion may be evenly or unevenly distributed along one or more principal axes. For example, in FIG. 2B dimensional distortion may be present along the x-axis 222, the y-axis 224, or along both axes. Some or all of the dimensional distortion may be linear or nonlinear. In addition, although illustrated along two principal axes, dimensional distortion may be present along a third axis as well. In the example shown in FIG. 2B, dimensional distortion is present only along the x-axis 230, wherein each of the respective areas of one color (e.g., white 214) and areas of the other color (e.g., black 216) have been reduced in width along the x-axis 230 by approximately 40%. Conversely, little or no dimensional distortion has occurred along the y-axis 232.

In at least some instances the distortion present in the image data may include both optical and dimensional distortion. In such instances the one or more processors 126 may calculate multiple distortion values including at least one optical distortion value indicative of the level of optical distortion present in the image data and at least one dimensional distortion value indicative of the level of dimensional distortion present in the image data. The at least one optical distortion value and the at least one dimensional distortion value may be stored or otherwise retained individually within the non-transitory storage media 130 or alternatively may be combined to provide at least one combined distortion value reflective of both the optical and dimensional distortion present in the image data.

Using one or more calibration parameters of the reference pattern 202 and based on the determined at least one distortion value, the one or more processors 126 can determine or otherwise generate one or more sets of distortion correction factors. Such sets of distortion correction factors can include one or more sets of optical distortion correction factors, one or more sets of dimensional distortion correction factors, or combinations thereof. The one or more sets of distortion correction factors can be wholly or partially stored or otherwise retained in the at least one non-transitory storage media 130. The one or more sets of distortion correction factors are used by the at least one processor 126 to reduce or eliminate the effects of distortion present in the image data on the determined dimensional, volumetric, volume dimensional, or cost data provided by the volume dimensioning system 100. Additionally, the one or more sets of distortion correction factors may be used to by the at least one processor 126 to correct the image data prior to using the image data to provide an output on the display 132.

The volume dimensioning system 100 can determine the at least one distortion value and one or more sets of distortion correction factors on a regular or irregular basis. For example, in some instances, the volume dimensioning system 100 can determine the at least one distortion value when the reference pattern 202 falls within the field of view of the at least one sensor 124 and the system 100 is not actively volume dimensioning an object. Such may occur when the volume dimensioning system 100 is placed in a defined location for example returned to a cradle or stand. In other instances, the routine range of motion may bring the reference pattern 202 within the field of view of the at least one sensor 124 as the volume dimensioning system is moved or displaced. For example, the reference pattern 202 may appear in the field of view of the at least one image sensor 124 when the volume dimensioning system 110 is moved from a "storage" position or location to a "ready" position or location, or from a "ready" position or location to a "storage" position or location. In yet other instances, the volume dimensioning system 100 may provide one or more human perceptible indicators or signals that prompt a user to at least partially align the volume dimensioning system 100 with the reference pattern 202 to permit the system to perform a distortion correction or calibration.

In other instances, determination of the at least one distortion value and optionally the determination of the at least one set of distortion correction factors may occur as a portion of the volume dimensioning system 100 calibration routine. For example, in some instances, the at least one distortion value may be determined prior to the performance of a volume dimensioning system calibration to improve or otherwise enhance the level of accuracy of the calibration. In some instances, such distortion correction or calibration routines may be time-based and conducted at regular or irregular intervals. In other instances, such distortion correction or calibration routines may be performance related and conducted based upon one or more measured system performance parameters. In yet other instances, such distortion correction or calibration routines may be time and performance based to comply with one or more corporate, industry, or regulatory standards, best practices, or guidelines.

Advantageously, the ability to detect the presence of distortion present in the image data, to quantify the distortion using at least one distortion value, to optionally determine one or more sets of distortion correction factors, and to optionally incorporate both into a volume dimensioning system calibration procedure reduces the likelihood of the volume dimensioning system 100 providing erroneous linear, volumetric, or shipping cost information. Such periodic detection and quantification of distortion present in the image data may be conducted on an automatic (i.e., system generated) or manual (i.e., at user discretion) basis at regular or irregular intervals.

Figure 3:
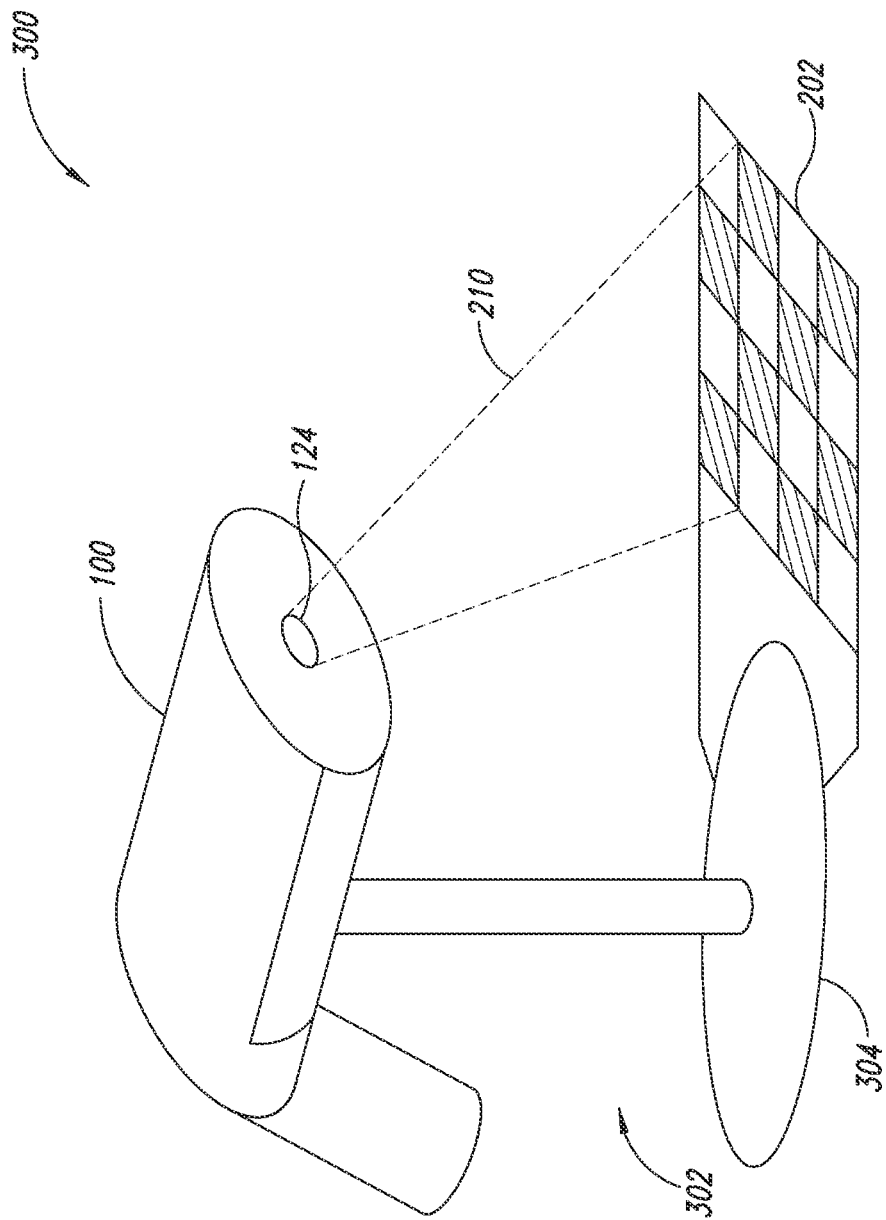
FIG. 3 is a perspective view of an example image sensor received by a stand member and having a reference pattern disposed in at least a portion of the field of view of the image sensor, according to one illustrative embodiment.

FIG. 3 shows a volume dimensioning system 100 that has been received by an exemplary support member 302 such as a stand or cradle. In at least some instances, at least a portion of a reference pattern 202 appears within the field of view 210 of the image sensor 124 when the volume dimensioning system 100 is received by the support member 302. The support member 302 may include a base member 304 to increase stability of the support member. Although depicted in FIG. 3 as supporting a handheld or portable volume dimensioning system 100, in some instances the support member 302 may receive only a portion, for example the sensor subsystem 118, of a larger or even stationary volume dimensioning system 100. The reference pattern 202 may be formed as a portion of the base member 304, separate from the base member 304, or as a member that is detachably attached to the base member 304.

The volume dimensioning system 100 may also include one or more sensors (not visible in FIG. 3) to detect the presence of the support member 302. Example sensors may include without limitation, one or more optical sensors, one or more ultrasonic sensors, one or more proximity sensors, or similar. Such sensors may provide one or more input signals to the at least one processor 126 indicating receipt of the volume dimensioning system 100 by the support member 302. In at least some instances, upon detection of the signal indicating receipt by the support member 302 the at least one processor 126 can initiate the capture of image data by the sensor subsystem 118. Since the reference pattern 202 lies within the field of view of the at least one image sensor 124, the image data so acquired may be used to determine at least one distortion value, calibrate the system 100, calculate one or more sets of distortion correction factors, or any combination thereof. In some instances, pattern image data from the sensor subsystem 118 received by the support member 302 may be wiredly or wirelessly communicated to a remote volume dimensioning system 100.

In at least some instances the reference pattern 202 can be formed on the base 304 or on a rigid or flexible member that is operably coupled or otherwise attached to the base member 304. The reference pattern 202 may be formed in different colors, materials, embossings, debossings, textures, engravings, or similar. In some instances, the reference pattern 202 may include one or more inscriptions, logos, designs, trademarked images, or the like. In at least some instances all or a portion of the reference pattern 202 and the base member 304 may be detached and mounted remotely from the support member 302. For example, in at least some instances the reference pattern 202 may be mounted on a vertical surface such as a wall or similar partition.

In at least some situations, when the volume dimensioning system 100 is received by the support member 302 the sensor subsystem 118 may autonomously provide pattern image data including at least the portion of the reference pattern 202 to the at least one processor 126. Autonomous provision of image data by the sensor subsystem 118 to the at least one processor 126 may occur at regular or irregular intervals. Autonomous collection of pattern image data may permit a more frequent updating of the at least one distortion value or the one or more sets of distortion correction factors than a manually initiated collection of pattern image data since such autonomous collection may occur at times when the volume dimensioning system 100 is not in active use. The pattern image data so acquired allows the at least one processor 126 to determine the at least one distortion value using the known reference pattern 202 calibration parameters. Access to pattern image data also optionally permits the at least one processor 126 to determine the one or more sets of distortion correction factors. Providing the at least one processor 126 with the ability to determine the at least one distortion value and the sets of distortion correction factors while the volume dimensioning system 100 is not in active use may advantageously increase the overall accuracy of the dimensional, volumetric, and cost information provided by the system 100.

Figure 4B:
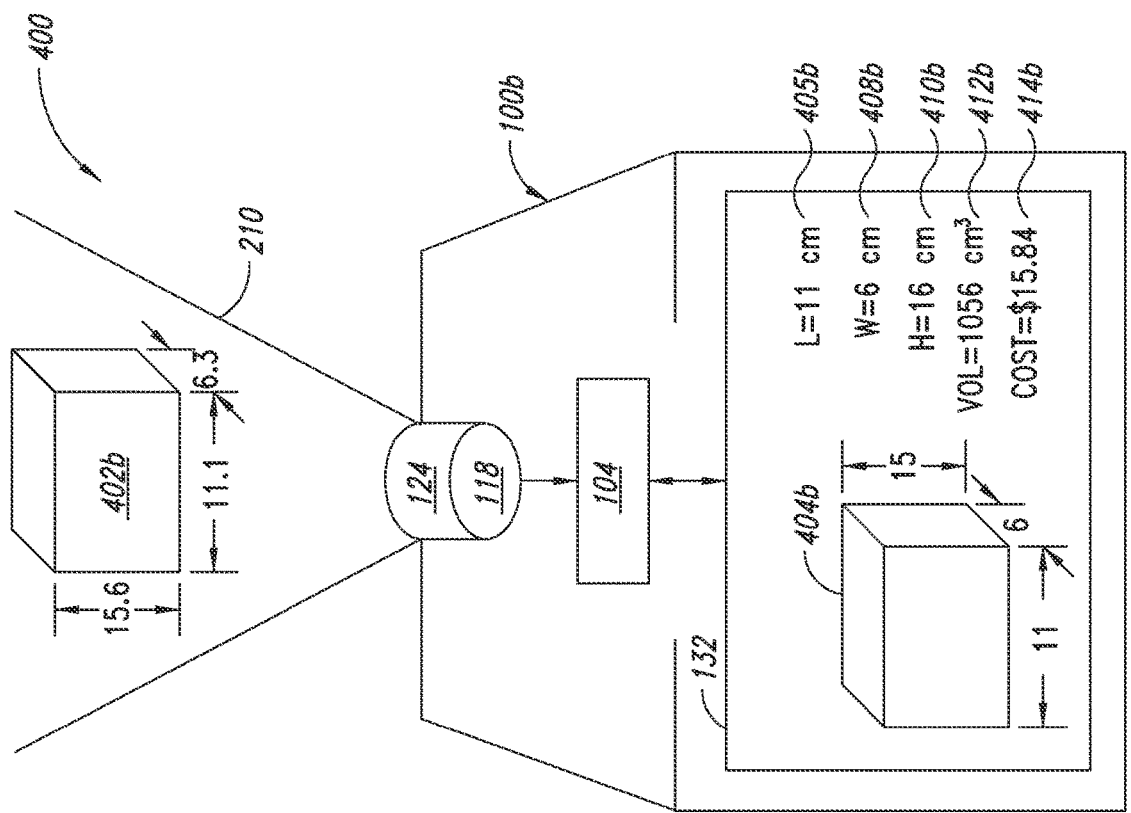
FIG. 4B is a perspective view of an example volume dimensioning system reporting dimensions to a second unit of based at least in part on at least one determined distortion value, according to one illustrative embodiment.
Figure 4A:
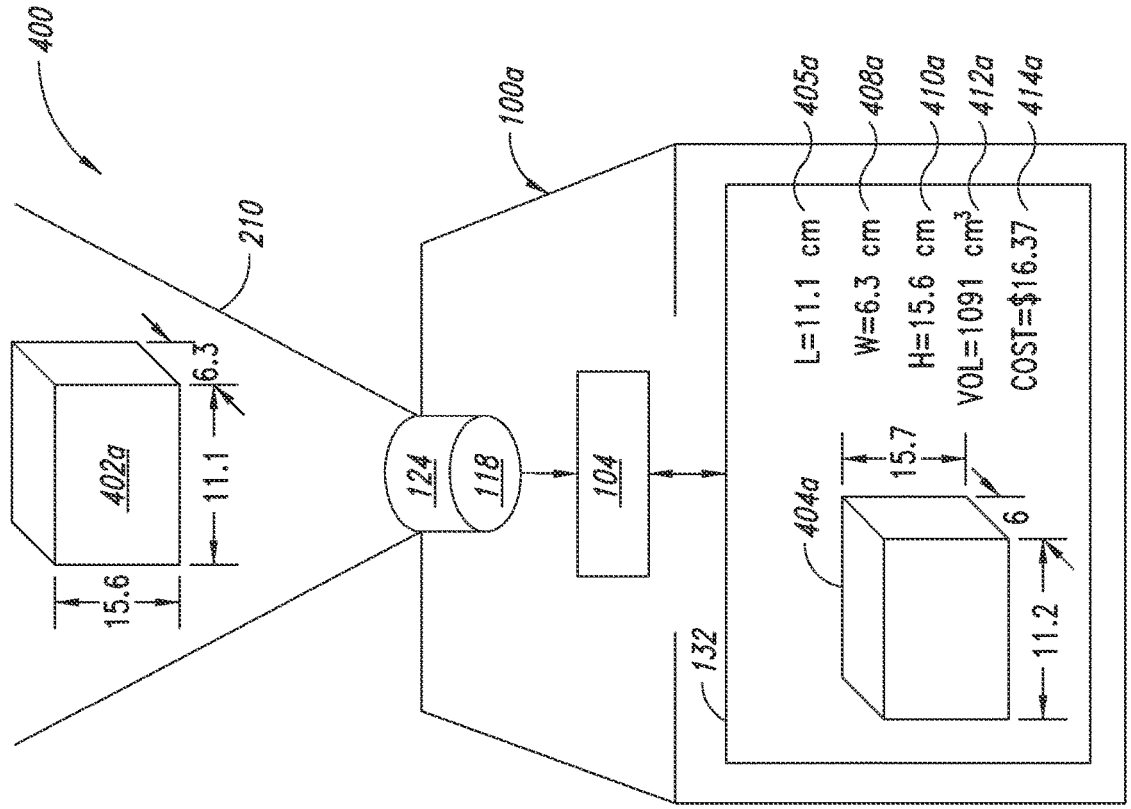
FIG. 4A is a perspective view of an example volume dimensioning system reporting dimensions to a first unit of accuracy based at least in part on at least one determined distortion value, according to one illustrative embodiment.

FIG. 4A provides a perspective view of an illustrative volume dimensioning system 100a where the at least distortion value within a first threshold permitting the use of a fine unit of accuracy (e.g., 1 mm depicted in FIG. 4A) to determine the dimensional, volumetric, and cost data associated with object 402a. FIG. 4B provides a perspective view of an illustrative volume dimensioning system 100b now where the at least distortion value is not within the first threshold permitting the use of a fine unit of accuracy and, as a consequence, the at least one processor 126 has autonomously shifted to the use of a coarse unit of accuracy (e.g., 1 cm depicted in FIG. 4B) to determine the dimensional, volumetric, and cost data associated with object 402b.

Although the object 402a is depicted as a cubic solid for simplicity and ease of illustration, it should be understood that similar principles as described below will apply to any object placed within the field of view of the volume dimensioning system 100. Object 402a is illustrated as having actual dimensions of 11.1 cm in length, 6.3 cm in width, and 15.6 cm in height. Such an object may be representative of a commonly encountered shipping container such as a cardboard box. Prior to placement of the object 402a in the field of view 210 of the imaging sensor 124, the volume dimensioning system 100a has determined through the use of a reference pattern 202 (not shown in FIG. 4A) that the at least one distortion value associated with the system 100a falls within a first threshold (e.g., a recalibration threshold) permitting use of a fine unit of accuracy in dimensioning, volume, and cost determination. In the example depicted in FIG. 4A, the fine unit of accuracy is 1 mm. The volume dimensioning system 100a is therefore able to determine the dimensions of the object 402a to the nearest millimeter. Thus, the volume dimensioning system 100a is able to determine the length 406a as 11.1 cm, the width 408a as 6.3 cm, and the height 410a as 15.6 cm. Using these determined dimensions, the volume dimensioning system 100a is further able to determine the volume 412a as 1091 cm$^3$. Finally, using the determined volume and assuming a shipping cost of $0.015/cm$^3$, the volume dimensioning system 100a can calculate the shipping cost 414a for object 402a is $16.37.

Object 402b has dimensions identical to object 402a, 11.1 cm in length, 6.3 cm in width, and 15.6 cm in height. However, prior to placement of the object 402b in the field of view 210 of the imaging sensor 124, the volume dimensioning system 100b has determined through the use of a reference pattern 202 (not shown in FIG. 4B) that the at least one distortion value associated with the system 100b falls outside a first threshold (e.g., a recalibration threshold) and within a second threshold (e.g., a service required threshold) which permits the use of a coarse unit of accuracy in dimensioning, volume determination and cost determination. In the example depicted in FIG. 4B, the coarse unit of accuracy is 1 cm, an order of magnitude larger than the fine unit of accuracy used in FIG. 4A. The volume dimensioning system 100b is therefore only able to determine the dimensions of the object 402b to the nearest centimeter. Thus, the volume dimensioning system 100b determines the length 406b as 11 cm, the width 408b as 6 cm, and the height 410b as 16 cm. Using these determined dimensions, the volume dimensioning system 100b is further able to determine the volume 412b as 1056 cm$^3$. Finally, using the determined volume and assuming a shipping cost of $0.015/cm$^3$, the volume dimensioning system 100b is able to calculate the shipping cost 414b for the object 402b is $15.84.

In at least some instances, the volume dimensioning system 100 can correct distortion present in only a portion of the overall image. For example, the volume dimensioning system 100 may correct only the portion of the image containing the object 402. Such local correction can proceed using one or more correction factors determined based at least in part on any distortion present in the portion of the image containing and/or proximate the object 402. Such local distortion correction factors can be used in a manner similar to image wide distortion correction factors, for example to determine the dimensional accuracy achievable with regard to the object 402 and to determine whether a fine unit of accuracy or a coarse unit of accuracy should be used in assessing dimensional and cost information for the object 402.

Figure 5:
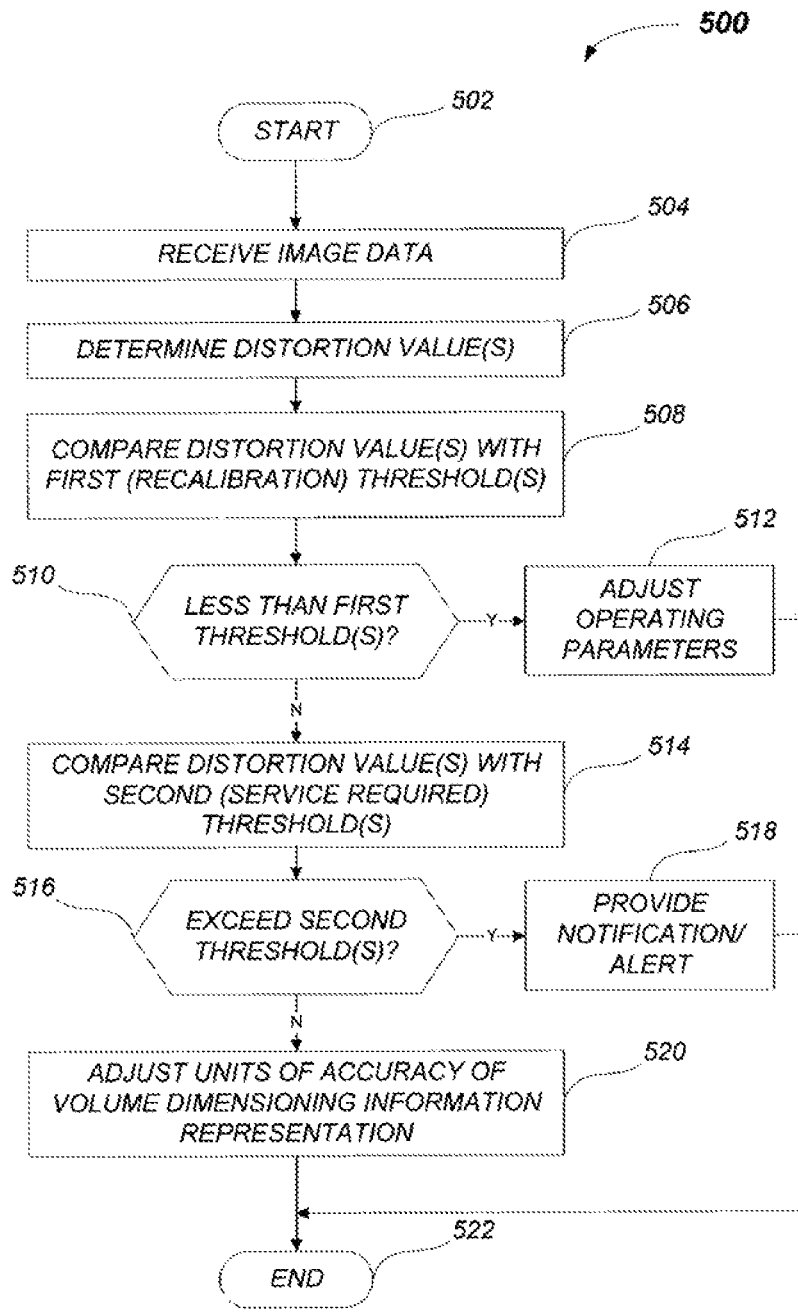
FIG. 5 is a flow diagram showing a high level method of operation of a volume dimensioning system including the determination of at least one distortion value and one or more sets of distortion correction factors, according to one illustrated embodiment.

FIG. 5 is a flow diagram 500 showing a high level method of operation of a volume dimensioning system 100. The method starts at 502. At 504 the at least one processor 126 receives pattern image data from the sensor subsystem 118. In at least some instances, such pattern image data may be autonomously acquired at regular or irregular intervals by the volume dimensioning system 100. For example, pattern image data may be acquired at regular or irregular intervals when the all or a portion of the volume dimensioning system 100 is received by the support member 302. In other instances, such pattern image data may be manually acquired at regular or irregular intervals by the volume dimensioning system 100. For example, the volume dimensioning system 100 may provide one or more human perceptible indicators to a user that indicate the reference pattern 202 should be placed in the field of view of the at least one sensor 124 to permit the acquisition of pattern image data for distortion correction or calibration purposes.

At 506 the at least one processor 126 determines at least one distortion value using the pattern image data received from the sensor subsystem 118 at 504. The at least one processor 126 can determine any number of distortion values, including at least one of: an optical distortion value, a dimensional distortion value, a chromatic aberration or distortion value, or combinations thereof. The distortion values so determined provide a quantitative measure or assessment of the overall quality of the image data provided by the sensor subsystem 118. In some instances, all or a portion of the at least one distortion values determined by the at least one processor 126 at 506 can be stored or otherwise retained within the at least one non-transitory storage media 130.

At 508 the at least one processor 126 compares the determined at least one distortion value from 506 with a first distortion threshold. A determined at least one distortion value falling within the first distortion threshold indicates the distortion present in the image data provided by the sensor subsystem 118 is sufficiently small that a fine unit of accuracy may be used in determining and calculating dimensional, volumetric, and cost information. Conversely, a determined at least one distortion value exceeding the first distortion threshold may indicate the level of distortion present in the image data provided by the sensor subsystem 118 is sufficiently large that the use of the fine unit of accuracy is inappropriate and a coarse unit of accuracy should instead be used to determine and calculate dimensional, volumetric, and cost information. Such distortion thresholds may be provided as one or more factory settings or one or more periodically updated thresholds that are stored or otherwise retained in the at least one non-transitory storage media 130.

Advantageously, such adjustments are made autonomously by the volume dimensioning system 100 without user intervention using the determined at least one distortion value and a plurality of distortion thresholds stored or otherwise retained within the non-transitory storage media 130. For illustrative purposes, Table 1 lists one set of example values that may be associated with "fine" and "coarse" units of accuracy:

TABLE 1

Example Units of Accuracy

| | "Fine" Unit of Accuracy | "Coarse" Unit of Accuracy |
|---|---|---|
| Dimensional Units | ½ inch | 2 inches |
| Volumetric Units | 1 in$^3$ | 8 in$^3$ |
| Cost Units | $0.01 | $0.10 |

At 510, if the at least one processor 126 finds the distortion value determined at 506 is within or less than the first distortion threshold, the at least one processor 126 can adjust one or more volume dimensioning system parameters at 512. In at least some instances, at 512 the one or more processors 126 may calculate one or more sets of distortion correction factors to reduce or eliminate the distortion present in the image data provided by the sensor subsystem 118 using the one or more distortion values determined at 506. In some instances, adjusting the one or more volume dimensioning system parameters at 512 may also include confirming the fine units of accuracy are being used, performing one or more calibration routines, or combinations thereof.

At 514 the at least one processor compares the at least one distortion value determined at 506 with a second distortion threshold. If at 510 the at least one processor 126 found the at least one distortion value determined at 506 exceeded the first distortion threshold at 510, the at least one processor 126 can compare the determined at least one distortion value with a second distortion threshold at 514. In at least some instances, distortion values exceeding the second distortion threshold may indicate the presence of distortion in the image data provided by the sensor subsystem 118 that is of a magnitude or severity sufficient to render the system 100 unusable based on one or more corporate, industry, or regulatory guidelines, best practices, or standards.

Although FIG. 5 illustrates the use of only two distortion thresholds, any number of distortion thresholds may be similarly used. Different distortion threshold values may be indicative, for example, of varying levels or degrees of distortion in the image data provided by the sensor subsystem 118. Each of the different levels or degrees of distortion may indicate the need for the system 100 to use a corresponding unit of accuracy in displaying dimensional, volumetric or cost information. For example a first threshold value may be indicative of distortion that allows a unit of accuracy of 1 mm; a second threshold value may be indicative of distortion that allows a unit of accuracy of 2 mm; a third threshold value may be indicative of distortion that allows a unit of accuracy of 3 mm; a fourth threshold value may be indicative of distortion that allows a unit of accuracy of 4 mm; a fifth threshold value may be indicative of distortion that allows a unit of accuracy of 5 mm; and a sixth threshold value may be indicative of distortion sufficient to generate a human perceptible "service required" indicator on the system 100.

If at 516 the at least one processor 126 finds the at least one distortion value determined at 506 exceeds or is greater than the second distortion threshold, the at least one processor 126 can generate one or more human perceptible outputs indicative of a "service required" condition at 518. In some instances at 518, one or more functions or features of the volume dimensioning system 100, for example the costing functionality, may be inhibited if the distortion value exceeds the second distortion threshold.

At 520, if the at least one processor 126 found the distortion value determined at 506 fell between the first and the second distortion thresholds at 516, the at least one processor 126 can adjust the units of accuracy of the information presented by the volume dimensioning system 100. In at least some instances, at least one processor 126 can adjust dimensional, volumetric or cost information provided by the volume dimensioning system 100 to one or more coarse units of accuracy. In at least some instances, at 520 the one or more processors 126 may calculate one or more sets of distortion correction factors to reduce or eliminate the distortion present in the image data provided by the sensor subsystem 118 using the one or more distortion values determined at 506. The one or more coarse units of accuracy cause the system 100 to determine, calculate, and display dimensional, volumetric, and cost data in units of accuracy that are based at least in part on the capability of the system 100 to resolve such dimensions and volumes based on the distortion values determined at 506. In at least some instances, some or all of the units of accuracy may be based on one or more corporate, industry, or regulatory guidelines, best practices, or standards. In some instances, for example, the units of accuracy used by the volume dimensioning system may be based on the NIST Handbook 44-2012 Chapter 5.58. The method 500 terminates at 522.

Figure 6:
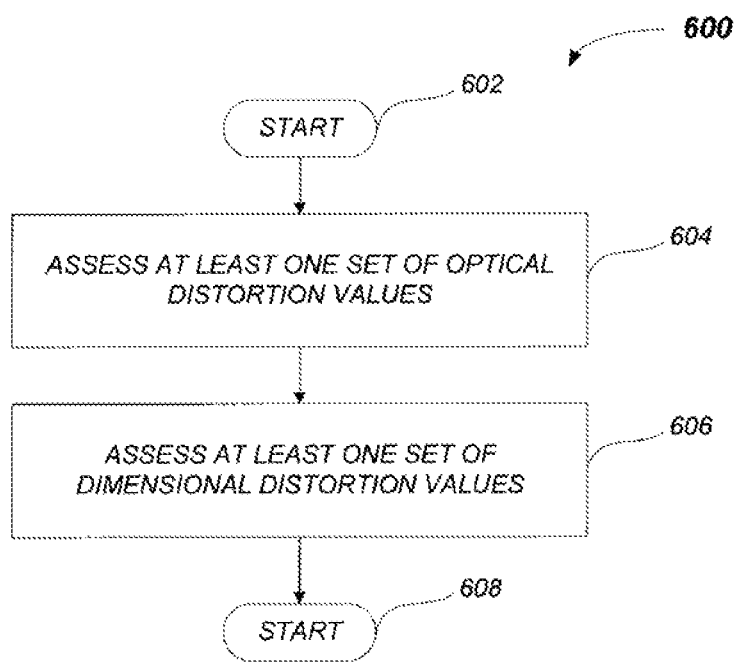
FIG. 6 is a flow diagram showing a low level method of operation of a volume dimensioning system including an assessment of at least one set of optical distortion values and at least one set of dimensional distortion values, according to one illustrative embodiment.

FIG. 6 is a flow diagram 600 showing a low level method of operation of a volume dimensioning system 100. In particular, the method 600 illustrates an example method that may be used by the at least one processor 126 to assess the at least one distortion value at 506. The method 600 starts at 602. At 604 the at least one processor 126, using the pattern image data provided by the sensor subsystem 118, assesses the optical distortion present in the image data by determining at least one optical distortion value. The at least one optical distortion value determined at 604 can provide a quantitative measure of the degree or magnitude of the optical distortion present in the image data provided by the sensor subsystem 118. Such a quantitative measure of the optical distortion present in the image data may be obtained by the at least one processor 126 using one or more numerical distortion analysis techniques, graphical distortion analysis techniques, or combinations thereof.

At 606 the at least one processor 126 assesses the image data supplied by the sensor subsystem 118 for dimensional distortion. The assessment of the dimensional distortion by the at least one processor 126 determines at least in part at least one dimensional distortion value. The at least one dimensional distortion value determined at 606 can provide a quantitative measure of the degree or magnitude of the dimensional distortion present in the image data provided by the sensor subsystem 118. Such a quantitative measure of the dimensional distortion present in the image data may be obtained by the at least one processor 126 using one or more numerical distortion analysis techniques, graphical distortion analysis techniques, or combinations thereof. After the at least one processor 126 has determined at least one distortion value attributable to either or both optical and dimensional distortion present in the image data provided by the sensor subsystem 118, the method 600 concludes at 608.

Figure 7:
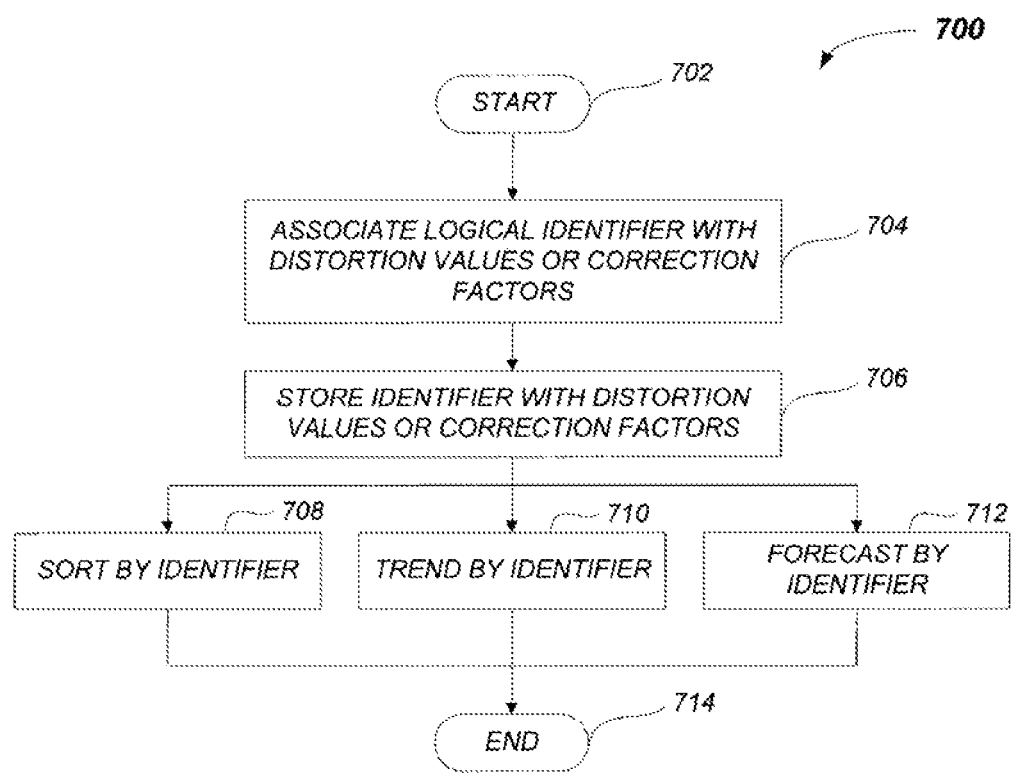
FIG. 7 is a flow diagram showing a high level method of operation of a volume dimensioning system incorporating the storage and reporting of historical distortion values or correction factors, according to one illustrated embodiment.

FIG. 7 is a flow diagram 700 showing a low level method of operation of a volume dimensioning system 100. In particular, the method 700 illustrates an example method that may be used by the at least one processor 126 to store historical distortion data including determined distortion values and distortion correction factors in the non-transitory storage media 130. Such historical data provides a valuable resource in tracking the performance history of the volume dimensioning system 100 and in providing a tool for predicting the future performance of the system 100. In some instances, collection of such historical data may assist in compliance with one or more corporate, industry, or regulatory guidelines, best practices, or standards. Advantageously, since the determination of distortion values and distortion correction factors may be performed autonomously by the volume dimensioning system 100, the presence of such historical data in the non-transitory storage media 130 provides the system user with assurance that such distortion detection and correction routines are being performed by the system 100. The example method to store historical distortion data begins at 702.

At 704, the at least one processor 126 can associate one or more identifiers with the at least one distortion value determined at 506 or the one or more sets of distortion correction factors determined at 512 or 520. Any type of logical identifier, including one or more sequential or chronological identifiers, may be so associated with the at least one distortion value. The association of one or more logical identifiers with the at least one distortion value or the one or more sets of distortion correction factors permits the retrieval and presentation of such data in an organized and logical manner. Storage of such historical data may also assist in compliance with one or more corporate, industry, or regulatory guidelines, best practices, or standards.

At 704 the at least one processor 126 can associate one or more logical identifiers with all or a portion of the distortion values (i.e., determined at 506) or all or a portion of the calculated sets of distortion correction factors (i.e., calculated at 512 or 520). In at least some instances, the one or more logical indicators can include one or more chronological indicators such as date and time of determination of the at least one distortion value or calculation of the set of distortion correction factors by the at least one processor 126. In some instances, the one or more logical indicators can include one or more serialized indicators sequentially assigned by the at least one processor 126 upon determining the at least one distortion values or calculating the set of distortion correction factors. Any similar logical indicators that provide the ability to retrieve, sort, organize, or display the associated distortion values or distortion correction factors in a logical manner may be so assigned by the at least one processor 126.

At 706, the at least one distortion value or the set of distortion correction factors and the associated logical identifier are at least partially stored within a non-transitory storage media 130. In at least some instances, at least a portion of the non-transitory storage media 130 can include one or more types of removable media, for example secure digital (SD) storage media, compact flash (CF) storage media, universal serial bus (USB) storage media, memory sticks, or the like. The use of such removable storage media may advantageously permit the transfer of data such as the stored distortion values and distortion correction factors to one or more external computing devices equipped with a comparable removable storage media reader.

At 708, the stored distortion values or distortion correction factors are displayed sorted or otherwise arranged or organized by the associated identifier either on the internal display device 132 of the volume dimensioning system 100 or an external display device wiredly or wirelessly accessed by the system 100 via the communications subsystem 108.

At 710, the stored distortion values or distortion correction factors are displayed sorted by the associated identifier either on the internal display device 132 of the volume dimensioning system 100 or an external display device wiredly or wirelessly accessed by the system 100 via the communications subsystem 108. Additionally, one or more trend lines may be fitted to the displayed data to provide an indication of the overall rate of degradation or change in distortion of the image data provided by the sensor subsystem 118. Such trend data may be useful in detecting sudden or unexpected changes in the overall level of image data quality provided by the sensor subsystem 118 and may advantageously provide an indication of the overall condition of the sensor subsystem 118.

At 712, the stored distortion values or distortion correction factors are displayed sorted by the associated identifier either on the internal display device 132 of the volume dimensioning system 100 or an external display device wiredly or wirelessly accessed by the system 100 via the communications subsystem 108. Additionally, through the use of one or more trend lines or similar data analysis techniques, a performance forecast is provided. Such performance forecasts may identify an expected date or timeframe in which the image data provided by the sensor subsystem 118 will no longer fall within an acceptable distortion threshold. Such data may advantageously indicate or predict an expected date at which the sensor subsystem 118 or the volume dimensioning system 100 may require service or replacement. The method 700 terminates at 714

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other automated systems, not necessarily the exemplary volume dimensioning system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with one or more variations. For example, many of the methods may include additional acts, omit some acts, and/or perform or execute acts in a different order than as illustrated or described.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to U.S. provisional patent application Ser. No. 61/691,093, filed is incorporated herein by reference, in its entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A volume dimensioning system, comprising:
at least one image sensor that provides image data representative of a plurality of images of a field of view of the at least one image sensor; and
a control subsystem communicatively coupled to the at least one image sensor to receive the image data therefrom, the control subsystem including at least one non-transitory storage medium and at least one processor, wherein the at least one non-transitory storage medium is configured to store at least one of information or processor executable instructions, wherein the at least one processor is configured to:
determine at least one distortion value indicative of an amount of distortion in the plurality of images;
assess the at least one distortion value relative to a plurality of distortion threshold values; and
adjust an output of volume dimensioning related information comprising dimensional information, volume information, and cost information from a first unit of accuracy to a second unit of accuracy in a reporting of volume dimensioning related information based at least in part on the assessment of the at least one distortion value relative to the plurality of distortion threshold values and shipping cost for an object.

2. The volume dimensioning system according to claim 1, wherein the at least one processor is further configured to compare the determined at least one distortion value with a first distortion threshold value from the plurality of distortion threshold values, wherein the first distortion threshold value corresponds to a recalibration threshold.

3. The volume dimensioning system according to claim 2, wherein the at least one processor is configured to calculate one or more sets of distortion correction factors to eliminate distortion in the plurality of images when the at least one distortion value is within or less than the first distortion threshold value.

4. The volume dimensioning system according to claim 2, wherein the at least one distortion value exceeding the first distortion threshold value indicates that a distortion present in the image data is determined by the second unit of accuracy to calculate the dimensional information, the volume information, and the cost information.

5. The volume dimensioning system according to claim 2, wherein the at least one processor is further configured to compare the determined at least one distortion value with a second distortion threshold value from the plurality of distortion threshold values when the at least one distortion value exceeds the first distortion threshold value, wherein the second distortion threshold value corresponds to a service required threshold.

6. The volume dimensioning system according to claim 5, wherein the at least one processor is further configured to generate one or more human perceptible outputs when the at least one distortion value exceeds the second distortion threshold value.

7. The volume dimensioning system according to claim 6, wherein the at least one processor is further configured to inhibit the reporting of the shipping cost of the object when the at least one distortion value exceeds the second distortion threshold value.

8. The volume dimensioning system according to claim 5, wherein the output of volume dimensioning related information is adjusted from the first unit of accuracy to the second unit of accuracy when the at least one distortion value is less than the second distortion threshold value.

9. The volume dimensioning system according to claim 1, wherein the first unit of accuracy corresponds to a fine unit of accuracy, wherein the second unit of accuracy corresponds to a coarse unit of accuracy.

10. The volume dimensioning system according to claim 1, wherein the at least one distortion value corresponds to an optical distortion value, a dimensional distortion value, a chromatic aberration or distortion value, or combination thereof.

11. The volume dimensioning system according to claim 1, wherein the plurality of distortion threshold values is provided as one or more factory settings or one or more periodically updated threshold values that are stored or retained in the at least one non-transitory storage medium.

12. The volume dimensioning system according to claim 1, wherein the shipping cost for the object is based on a weight information of the object, volume information of the object, or both the weight information and the volume information of the object.

13. A volume dimensioning system, comprising:
at least one image sensor that provides image data representative of a plurality of images of a field of view of the at least one image sensor; and
a control subsystem communicatively coupled to the at least one image sensor to receive the image data therefrom, the control subsystem including at least one non-transitory storage medium and at least one processor, wherein the at least one non-transitory storage medium is configured to store at least one of information or processor executable instructions, wherein the at least one processor is configured to:
determine at least one distortion value indicative of an amount of distortion in the plurality of images based at least in part on at least a portion of a decodable indicia which appears in the field of view of the at least one image sensor in at least some of the plurality of images;
assess the at least one distortion value relative to a plurality of distortion threshold values; and
adjust an output of volume dimensioning related information comprising dimensional information and volume information from a first unit of accuracy to a second unit of accuracy in a reporting of volume dimensioning related information based at least in part on the assessment of the at least one distortion value relative to the plurality of distortion threshold values.

14. The volume dimensioning system according to claim 13, wherein the decodable indicia encodes information related to recipient information, sender information, and specific handling instructions corresponding to an object.

15. The volume dimensioning system according to claim 13, wherein physical parameters associated with the decodable indicia are provided as one or more factory settings or communicated to the at least one non-transitory storage medium.

16. The volume dimensioning system according to claim 13, wherein the decodable indicia is mounted on a vertical surface.

17. A volume dimensioning method, comprising:
receiving, by at least one dimensioning system processor, image data representative of a plurality of images in a field of view of at least one image sensor;
determining, by the at least one dimensioning system processor, at least one distortion value indicative of an amount of distortion in the plurality of images based at least in part on at least a portion of a calibration pattern which appears in a field of view of the at least one image sensor in at least some of the plurality of images, the calibration pattern having a set of defined characteristics;
assessing, by the at least one dimensioning system processor, the at least one distortion value relative to a plurality of distortion threshold values stored in a non-transitory storage medium communicably coupled to the at least one dimensioning system processor; and
adjusting, by the at least one dimensioning system processor, an output of reported volume dimensioning related information comprising dimensional information and volume information from a first unit of accuracy to a second unit of accuracy in a representation of volume dimensioning related information based at least in part on the assessment of the at least one distortion value relative to the plurality of distortion threshold values.

18. The volume dimensioning method according to claim 17, further comprising storing, by the at least one dimensioning system processor, historical distortion data including the at least one distortion value and one or more distortion correction factors in the non-transitory storage medium.

19. The volume dimensioning method according to claim 18, further comprising:
associating, by the at least one dimensioning system processor, one or more logical identifiers with one or more distortion values that include the at least one distortion value and the one or more distortion correction factors for an organized and logical data retrieval and presentation;
displaying, by the at least one dimensioning system processor, the one or more distortion values and the one or more distortion correction factors in a sorted manner based on the associated one or more logical identifiers, wherein the one or more distortion values and the one or more distortion correction factors are displayed in the sorted manner on an internal display device of a corresponding volume dimensioning system or an external display device,
wherein the external display device is accessed by the corresponding volume dimensioning system via a communications subsystem; and
fitting, by the at least one dimensioning system processor, one or more trend lines to the displayed one or more distortion values and the one or more distortion correction factors to provide an indication of overall rate of change in distortion of the image data.

20. The volume dimensioning method according to claim 17, further comprising performing, by the at least one dimensioning system processor, one or more of tracking of performance history of a corresponding volume dimensioning system, predicting future performance of the corresponding volume dimensioning system, and assisting in compliance with one or more of standard guidelines and best practices.

* * * * *